(12) United States Patent
Tiwari et al.

(10) Patent No.: US 11,778,162 B2
(45) Date of Patent: Oct. 3, 2023

(54) METHOD AND SYSTEM FOR DRAPING A 3D GARMENT ON A 3D HUMAN BODY

(71) Applicant: Tata Consultancy Services Limited, Mumbai (IN)

(72) Inventors: Lokender Tiwari, Noida (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 113 days.

(21) Appl. No.: 17/646,330

(22) Filed: Dec. 29, 2021

(65) Prior Publication Data
US 2022/0368882 A1 Nov. 17, 2022

(30) Foreign Application Priority Data
Mar. 25, 2021 (IN) .............................. 202121013169

(51) Int. Cl.
*G06T 7/60* (2017.01)
*G06T 7/73* (2017.01)
(Continued)

(52) U.S. Cl.
CPC ............. *H04N 13/275* (2018.05); *G06T 7/60* (2013.01); *G06T 7/75* (2017.01); *H04N 13/282* (2018.05);
(Continued)

(58) Field of Classification Search
CPC .... G06T 7/70; G06T 7/73; G06T 7/75; G06T 7/60; G06T 2207/20081;
(Continued)

(56) References Cited

U.S. PATENT DOCUMENTS

| | | | |
|---|---|---|---|
| 9,189,886 | B2 | 11/2015 | Black et al. |
| 2021/0049811 | A1* | 2/2021 | Fedyukov ................. G06T 7/60 |
| 2021/0118239 | A1* | 4/2021 | Santesteban ......... G06Q 10/067 |

OTHER PUBLICATIONS

Gundogdu, Erhan, et al. "Garnet: A two-stream network for fast and accurate 3d cloth draping." Proceedings of the IEEE/CVF International Conference on Computer Vision. (Year: 2019).*

(Continued)

*Primary Examiner* — Diane M Wills
(74) *Attorney, Agent, or Firm* — Finnegan, Henderson, Farabow, Garrett & Dunner LLP

(57) ABSTRACT

This disclosure relates generally to method and system for draping a 3D garment on a 3D human body. Dressing digital humans in 3D have gained much attention due to its use in online shopping and draping 3D garments over the 3D human body has immense applications in virtual try-on, animations, and accurate fitment of the 3D garment is the utmost importance. The proposed disclosure is a single unified garment deformation model that learns the shared space of variations for a body shape, a body pose, and a styling garment. The method receives a plurality of human body inputs to construct a 3D skinned garments for the subject. The deep draper network trained using a plurality of losses provides efficient deep neural network based method that predicts fast and accurate 3D garment images. The method couples the geometric and multi-view perceptual constraints that efficiently learn the garment deformation's high-frequency geometry.

14 Claims, 17 Drawing Sheets

(51) Int. Cl.
*H04N 13/275* (2018.01)
*H04N 13/282* (2018.01)

(52) U.S. Cl.
CPC ............... *G06T 2207/20081* (2013.01); *G06T 2207/20084* (2013.01); *G06T 2207/30196* (2013.01); *G06T 2210/16* (2013.01); *G06T 2210/21* (2013.01)

(58) Field of Classification Search
CPC . G06T 2207/20084; G06T 2207/30196; G06T 2210/16; G06V 40/10; G06V 40/103
See application file for complete search history.

(56) References Cited

OTHER PUBLICATIONS

Saito, Shunsuke, et al. "Pifuhd: Multi-level pixel-aligned implicit function for high-resolution 3d human digitization." Proceedings of the IEEE/CVF Conference on Computer Vision and Pattern Recognition (Year: 2020).*

Chaitanya Patel et al., "The Virtual Tailor: Predicting Clothing in 3D as a Function of Human Pose, Shape and Garment Style", Computer Science, Mar. 2020, Semantic Scholar, https://www.researchgate.net/publication/343007006_TailorNet_Predicting_Clothing_in_3D_as_a_Function_of_Human_Pose_Shape_and_Garment_Style/link/5f11589d92851c1eff183f04/download.

* cited by examiner

METHOD AND SYSTEM FOR DRAPING A 3D GARMENT ON A 3D HUMAN BODY

CROSS-REFERENCE TO RELATED APPLICATIONS AND PRIORITY

This U.S. Patent application claims priority under 35 U.S.C § 119 to: Indian patent Application no. 202121013169, filed on Mar. 25, 2021. The entire contents of the aforementioned application are incorporated herein by reference.

TECHNICAL FIELD

The disclosure herein generally relates to 3D garments, and, more particularly, to method and system for draping a 3D garment on a 3D human body.

BACKGROUND

Online shopping enables to shop when regular stores are closed, being able to view merchandise distant store relatively quickly, certainly more quickly than visiting many stores in person. Dressing digital humans in 3D have gained much attention due to its use in online shopping, virtual try-on, gaming, 3D content generation etc. Sales of 3D clothing items in such latest online shopping drastically increases and the world market reaches billions in sales. But problems may still be encountered by the merchant when displaying garments in an online fitting room to a user. For many garments, users are very sensitive to the look they project if they purchase and wear a garment. While some of the existing methods try to animate the clothes based on a body pose, they are inaccurate in fitting, and often rendering the cloth is not consistent with the size and shape of humans and garments.

Conventionally online shopping provides customer to shop from the comfort of the home and get access to a wide range of the latest products. However, online shopping has one major limitation which does not enable buyers to try clothes physically, resulting in a high return/exchange rate due to the cloth fitting issues. The concept of virtual try-on helps to resolve such limitation and allow buyers to visualize any garment on its 3D avatar as if they are wearing it. Further, the two important factors that a buyer considers while deciding to purchase the garments are its fitting and appearance. In the virtual try-on setup, a person can infer a garment's fitness by looking at the wrinkles in various poses and the gap between the body and the garment in the rendered image or video.

In one existing method, Physics-Based Simulation (PBS) generates accurate and realistic draping the garments over the human body. However, this PBS method considers many factors while simulating garments over the human body, which makes it computationally expensive and non-ideal for real-time/web-based applications. Additionally, the PBS based garment simulation requires expert knowledge to design the garment and tune the parameters to obtain desired results. In such scenario, involvement of such expert increases the cost and, therefore not scalable. Further, these methods learn to predict the garment deformation and draping using the PBS based ground truth data. Such, draping of garments on the human body is affected by three important factors that includes a human body shape, a human body pose and a garment style (e.g., long t-shirt, short t-shirt). In contrast to such computational expensive PBS based garment draping methods, learning based methods have gained much attention due to speed and less manual intervention.

Most of the existing methods learn to deform the garment as a function of one or two of the above factors focus on predicting garment style keeping the pose fixed. In another method the garment deformation is the function of the body shape and its pose which keeps the body shape fixed for draping. Apart from the body pose and the body shape, the garments also varies in its style, e.g., the t-shirt can have different variations along its length or sleeve length. Due to these variations, different garment styles deform differently on different body shapes and body poses. Therefore, the models trained on the single garment style have restricted use that do not consider different garment styles in their modeling process tends to produce over-smooth results.

In another existing method learns the garment deformation as the function of all the three important factors such as the body shape, the body pose, and the garment style. The realistic draping results in one existing method represents the importance of considering the garment style as one of the important factors along with the body shape and the body pose in the garment modeling. However, this method decomposes the deformed garment into a low frequency geometry and a high frequency geometry. They predict the high frequency geometry (wrinkles and folds) as a mixture of a fixed number of shape style specific garment deformation models. This existing method, learns 20 shape style specific deformation models to capture the high frequency geometry and one deformation model to predict smooth low frequency geometry and combine them using an RBF Kernel to produce the final garment deformation. Such existing methods limits in firstly, having a fixed number (20) of mixture components makes it sensitive towards the number of mixture components, and secondly, predicting inaccurate fitting as rendering is independent of input size (body measurements) of the subject. The sensitivity of the number of mixture components is evident that the wrinkles in the final rendering vary a lot on the number of mixtures used. Moreover, since each of the shape-style specific models learned separately, defeats the purpose of jointly modeling all the variations in the style, the body shape, and the body poses. Secondly, predicting inaccurate fitting as rendering is independent of input size (body measurements) of the human body.

SUMMARY

Embodiments of the present disclosure present technological improvements as solutions to one or more of the above-mentioned technical problems recognized by the inventors in conventional systems. For example, in one embodiment, a system for draping a 3D garment on a 3D human body is provided. The system includes receiving a plurality of human body inputs which includes data representation of a subject. For the plurality of human body inputs using a skinned multi person linear (SMPL) model, a 3D human body of the subject is created based on a body shape ($\beta$), and a body pose ($\theta$) of the plurality of human body inputs. The multi-layer perceptron model predicts a garment vertices offsets based on the plurality of human body inputs to construct a 3D skinned garments for the subject using the garment vertex offset using a garment skinning function. Further, a trained deep draper network drape the 3D skinned garments for the 3D human body of the subject based on (i) the garment vertices offsets, and (iii) a plurality of predefined ground truth garment intermediate features obtained from the trained deep draper network, wherein the deep draper network is trained based on a plurality of losses.

In one embodiment, training the deep draper network comprises, constructing, a plurality of training data inputs for the deep draper network from a one or more subjects, wherein the plurality of training data inputs includes (i) the training data body measurements ($\alpha$), (ii) the training data body shape ($\beta$), (iii) the training data body pose ($\theta$), and (iv) the training data garment style coefficient ($\gamma$). Further using a multi-layer perceptron model, the garment vertices offsets ($\hat{O}$) and a garment vertex normal are predicted based on the plurality of training data inputs and a trained model parameters, wherein each training data body shape includes a first body coefficient and a second coefficient. Then, a 3D skinned garment images are predicted by applying (i) the garment skinning function on the garment vertices offsets, (ii) the training data body pose, (iii) the training data body shape, (iv) the training data body measurements, and (v) the training data garment style coefficients. Further, a texture ($\hat{T}$) is assigned to each predicted 3D skinned garment vertices offsets as a function of its unit texture normal ($\widehat{n_t}$).

Further using a multiview garment rendering model, a multi view of the 3D skinned garment images are generated to exploit correlation between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image. The multi views of the 3D skinned garment images are fed as input to a VGG19 network to predict garment intermediate features. Then, the predicted garment intermediate features are compared with the plurality of pre-defined ground truth garment intermediate features to obtain a perceptual loss corresponding to each multi view of the 3D skinned garment images, and updating, the multi-layer perceptron model of the deep draper network based on the plurality of losses comprising (i) a perceptual loss, (ii) a geometric data loss, (iii) a body garment collision loss, and (iii) an image content loss.

In another aspect, a method for draping a 3D garment on a 3D human body is provided. The method includes receiving a plurality of human body inputs which includes data representation of a subject. For the plurality of human body inputs using a skinned multi person linear (SMPL) model, a 3D human body of the subject is created based on a body shape ($\beta$), and a body pose ($\theta$) from the plurality of human body inputs. The multi-layer perceptron model predicts a garment vertices offsets based on the plurality of human body inputs to construct a 3D skinned garments for the subject using the garment vertex offset using a garment skinning function. Further, a trained deep draper network drape the 3D skinned garments for the 3D human body of the subject based on (i) the garment vertices offsets, and (iii) a plurality of pre-defined ground truth garment intermediate features obtained from the trained deep draper network, wherein the deep draper network is trained based on a plurality of losses.

In one embodiment, training the deep draper network comprises, constructing, a plurality of training data inputs for the deep draper network from a one or more subjects, wherein the plurality of training data inputs includes (i) the training data body measurements ($\alpha$), (ii) the training data body shape ($\beta$), (iii) the training data body pose ($\theta$), and (iv) the training data garment style coefficients ($\gamma$). Further using a multi-layer perceptron model, the garment vertices offsets ($\hat{O}$) and a garment vertex normal are predicted based on the plurality of training data inputs and a trained model parameters, wherein each training data body shape includes a first body coefficient and a second coefficient. Then, a 3D skinned garment images are predicted by applying (i) the garment skinning function on the garment vertices offsets, (ii) the training data body pose, (iii) the training data body shape, (iv) the training data body measurements, and (v) the training data garment style coefficients. Further, a texture ($\hat{T}$) is assigned to each predicted 3D skinned garment vertices offsets as a function of its unit texture normal ($\widehat{n_t}$).

Further using a multiview garment rendering model, a multi view of the 3D skinned garment images are generated to exploit correlation between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image. The multi views of the 3D skinned garment images are fed as input to a VGG19 network to predict garment intermediate features. Then, the predicted garment intermediate features are compared with the plurality of pre-defined ground truth garment intermediate features to obtain a perceptual loss corresponding to each multi view of the 3D skinned garment images, and updating, the multi-layer perceptron model of the deep draper network based on the plurality of losses comprising (i) a perceptual loss, (ii) a geometric data loss, (iii) a body garment collision loss, and (iii) an image content loss.

In yet another aspect, provides one or more non-transitory machine readable information storage mediums comprising one or more instructions, which when executed by one or more hardware processors perform actions includes receiving a plurality of human body inputs which includes data representation of a subject. For the plurality of human body inputs using a skinned multi person linear (SMPL) model, a 3D human body of the subject is created based on a body shape ($\beta$), and a body pose ($\theta$) from the plurality of human body inputs. The multi-layer perceptron model predicts a garment vertices offsets based on the plurality of human body inputs to construct a 3D skinned garments for the subject using the garment vertex offset using a garment skinning function. Further, a trained deep draper network drape the 3D skinned garments for the 3D human body of the subject based on (i) the garment vertices offsets, and (iii) a plurality of pre-defined ground truth garment intermediate features obtained from the trained deep draper network, wherein the deep draper network is trained based on a plurality of losses.

In one embodiment, training the deep draper network comprises, constructing, a plurality of training data inputs for the deep draper network from a one or more subjects, wherein the plurality of training data inputs includes (i) the training data body measurements ($\alpha$), (ii) the training data body shape ($\beta$), (iii) the training data body pose ($\theta$), and (iv) the training data garment style coefficients ($\gamma$). Further using a multi-layer perceptron model, the garment vertices offsets ($\hat{O}$) and a garment vertex normal are predicted based on the plurality of training data inputs and a trained model parameters, wherein each training data body shape includes a first body coefficient and a second coefficient. Then, a 3D skinned garment images are predicted by applying (i) the garment skinning function on the garment vertices offsets, (ii) the training data body pose, (iii) the training data body shape, (iv) the training data body measurements, and (v) the training data garment style coefficients. Further, a texture ($\hat{T}$) is assigned to each predicted 3D skinned garment vertices offsets as a function of its unit texture normal ($\widehat{n_t}$).

Further using a multiview garment rendering model, a multi view of the 3D skinned garment images are generated to exploit correlation between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image. The multi views of the 3D skinned garment images are fed as input to a VGG19 network to predict garment intermediate features. Then, the predicted garment intermediate features are compared with the plurality of pre-defined ground truth garment intermediate features to obtain a perceptual loss corresponding to each multi view of the 3D skinned garment images, and updating, the multi-layer perceptron model of the deep draper network based on the plurality of losses comprising (i) a perceptual loss, (ii) a geometric data loss, (iii) a body garment collision loss, and (iii) an image content loss.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
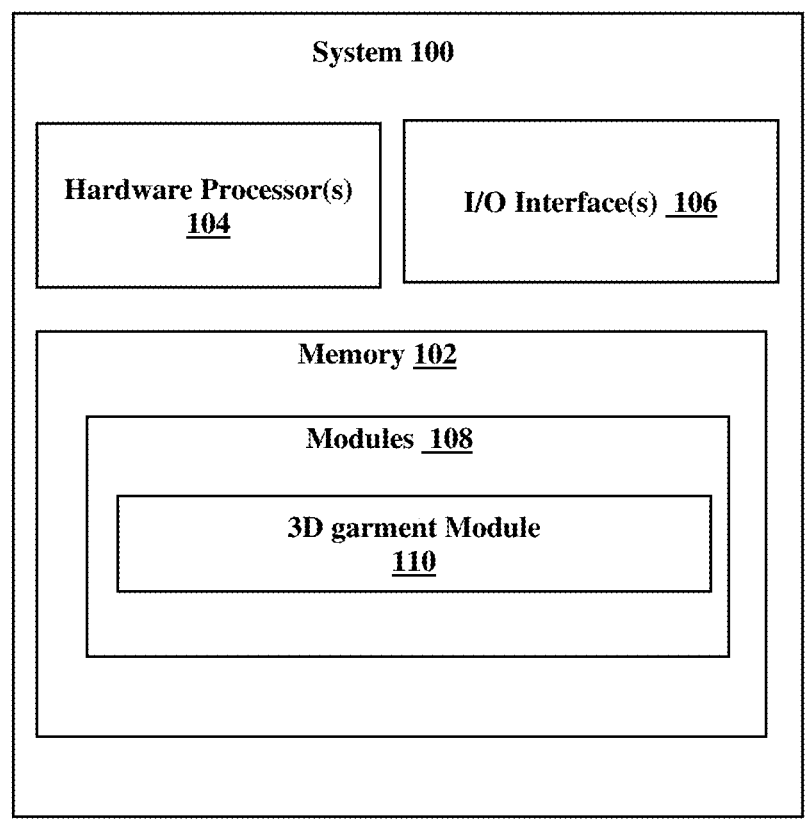
FIG. 1 illustrates an exemplary block diagram of a deep draper 3D garment system, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provides a method and system for draping a 3D garment on a 3D human body. The method disclosed, enables predicting accurately 3D skinned garment images for draping the 3D human body. The proposed method is an efficient deep neural network alternatively referred as a deep draper network that predicts fast and accurate 3D skinned garments. The system includes a Training phase, and an Inference phase. In Training phase, the deep draper network is pretrained with a multi-layer perceptron model and a multiview rendering model. The deep draper network is a single unified garment deformation mode trained using a plurality of losses for accurate fitness.

The coupling of geometric loss with the perceptual loss efficiently learns the garment deformation's in high-frequency geometry with realistic wrinkles and folds for accurate prediction of the 3D garments. The perceptual loss in the image space is obtained by a differential rendering layer. In Inference phase, the method receives a plurality of human body inputs to create a 3D human body using a skinned multi person linear (SMPL) model. The SMPL model fetches the body shape coefficient and estimates the body measurement for the subject for fitness, wrinkles and folds. Based on the multilayer perceptron model and a garment skinning function associated with the system, the 3D skinned garments are constructed for the subject utilizing the trained deep draper network.

Referring now to the drawings, and more particularly to FIG. 1 through FIG. 16, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as deep draper 3D garment system), in accordance with some embodiments of the present disclosure. In an embodiment, the deep draper 3D garment system 100 includes processor(s) 104, communication interface(s), alternatively referred as or input/output (I/O) interface(s) 106, and one or more data storage devices or memory 102 operatively coupled to the processor(s) 104. The system 100, with the processor(s) is configured to execute functions of one or more functional blocks of the system 100. Referring to the components of the system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 comprises a 3D garment module 110. The modules 108 can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s). The modules 108 includes the 3D garment module 110 for processing of a plurality of human body inputs received from one or more external sources.

Figure 2:
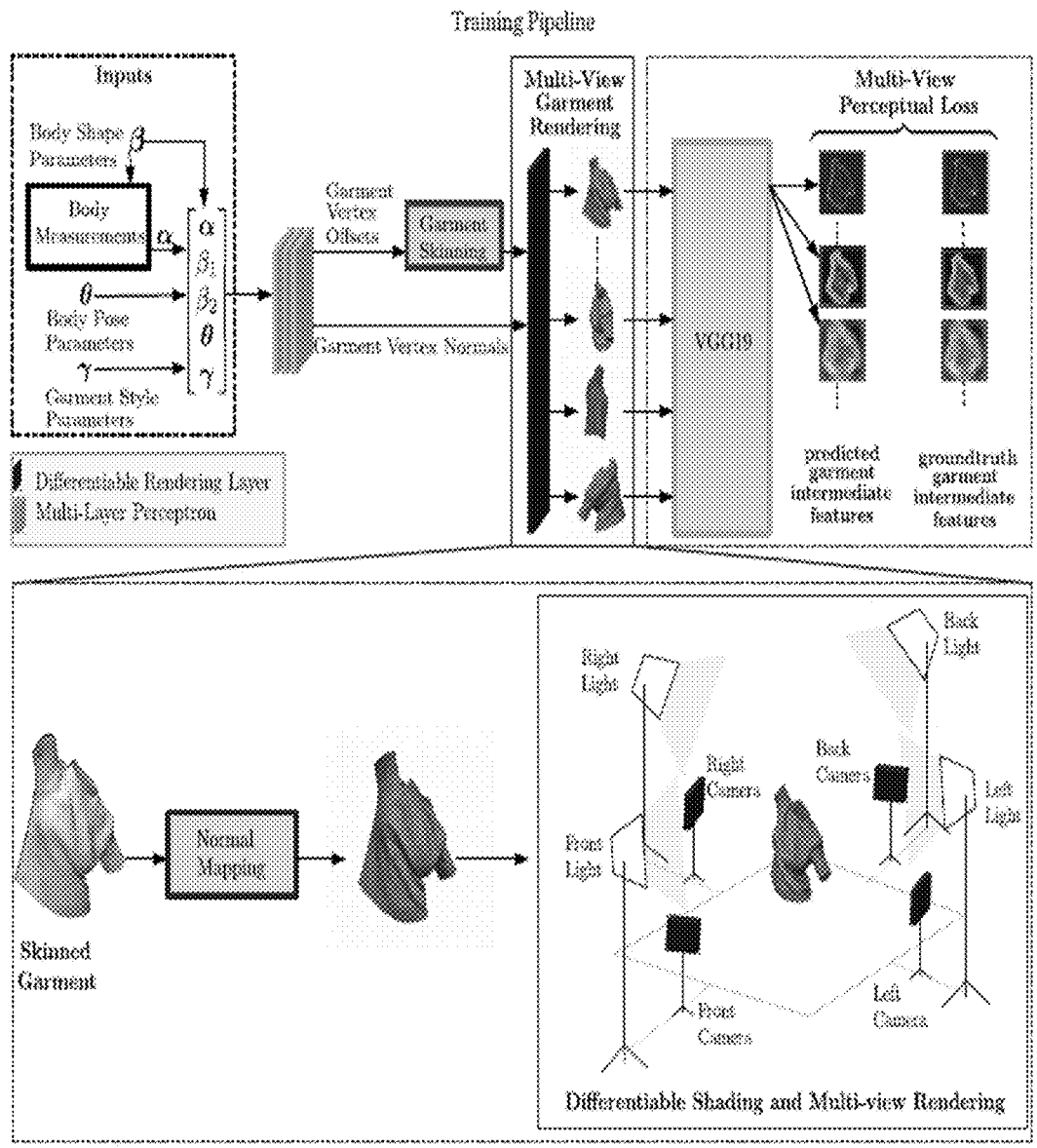
FIG. 2 illustrates a high level overview of draping 3D garments on a human body using a trained deep draper network using the system of FIG. 1, in accordance with some embodiments of the present disclosure.

FIG. 2 illustrates a high level overview of draping 3D garments on a human body using a deep draper network using the system of FIG. 1, in accordance with some embodiments of the present disclosure. The FIG. 2 includes a plurality of components comprising an SMPL which processes a one or more human body inputs, multi-layer perceptron, a multi view rendering, a VGG19 network, and a garment skinning function. The system receives the plurality of human body inputs from the one or more subjects and these inputs are further processed using the SMPL to generate a skeleton of the human body. The multi perceptron obtains the plurality of human body inputs to generate a garment vertex offsets for the subject, which is further fetched as an input to a garment skinning function. The multi view rendering module fetches the inputs from the garment skinning function to generate a multi view of 3D skinned garment images to exploit correlation between each high frequency garment in 3D with its corresponding a front view rendered image, a back view rendered image, a right view rendered image, a left view rendered image, and a top view rendered image. These multi views of the 3D skinned garment images are fetched by a VGG19 network as an input to predict garment intermediate features. The multi-layer perceptron updates the deep draper network based on the plurality of losses. Further, the memory 102 may comprises information pertaining to input(s)/output(s) of each step performed by the processor(s) 104 of the system 100 and methods of the present disclosure. Functions of the components of system 100, for time series prediction of target variable, are explained in conjunction with FIG. 2 through FIG. 16 providing flow diagram, architectural overviews, and performance analysis of the system 100.

Figure 3:
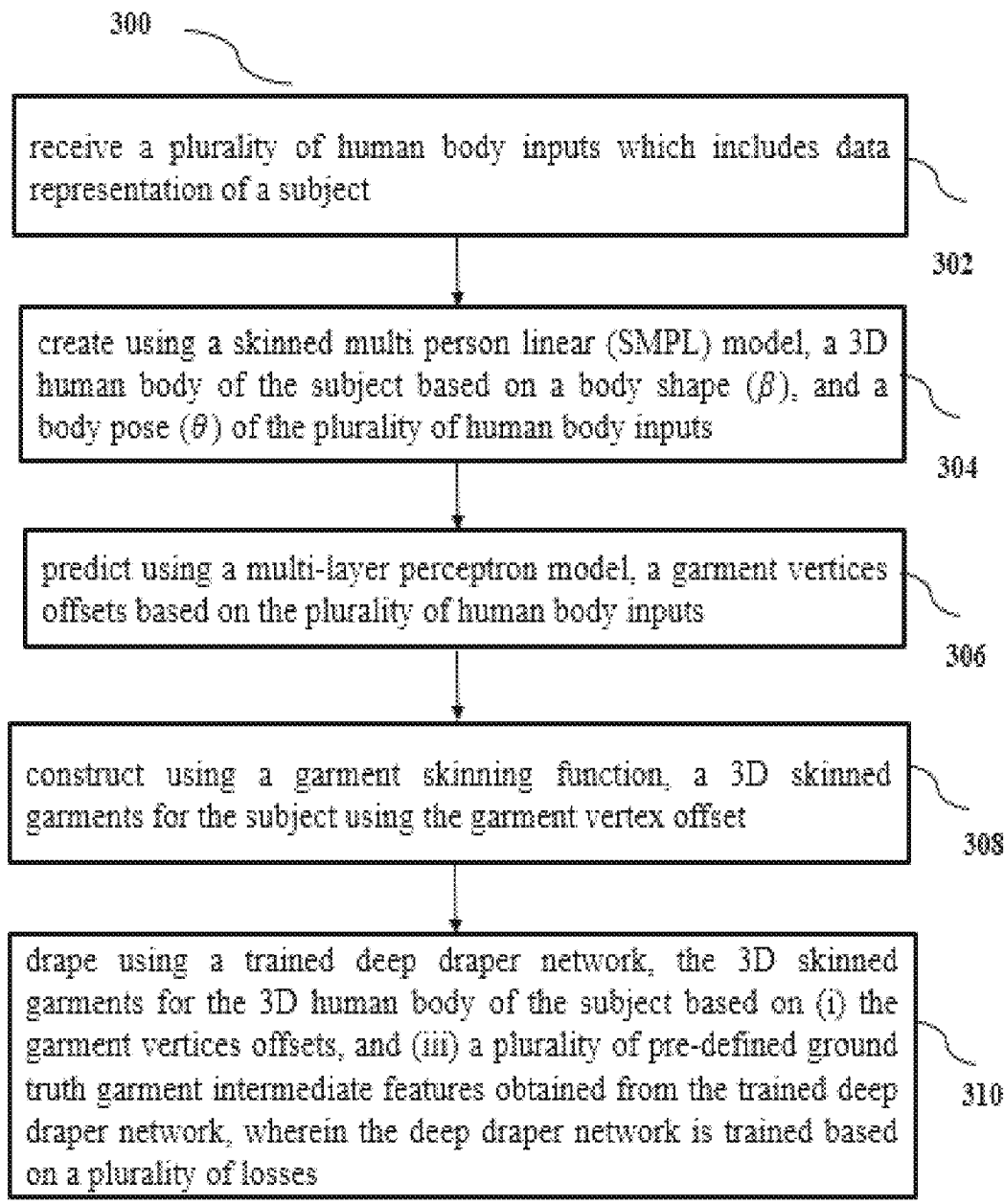
FIG. 3 is a flow diagram illustrating a method for draping 3D garments on the human body using the system of FIG. 1, in accordance with some embodiments of the present disclosure.
Figure 4:
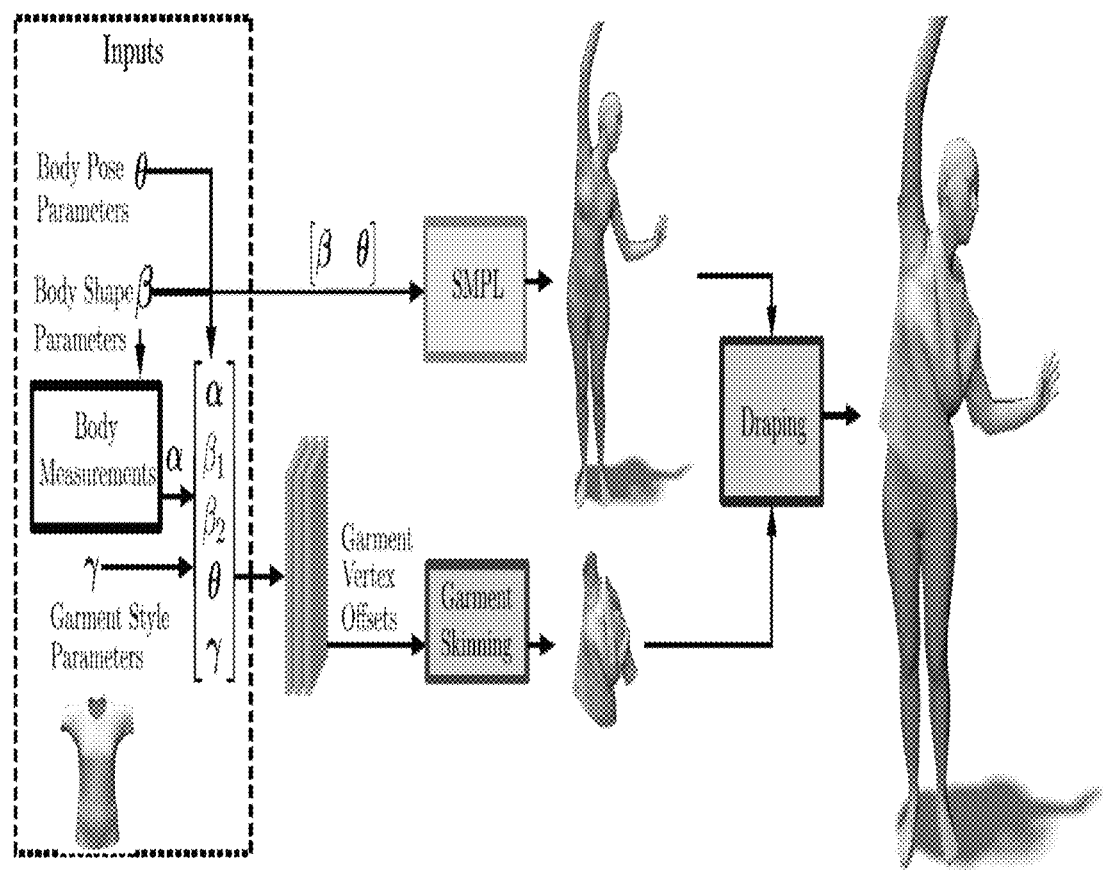
FIG. 4 illustrates a method of predicting 3D skinned garments for the human body using the trained deep draper network using the system of FIG. 1, in accordance with some embodiments of the present disclosure.

FIG. 3 is a flow diagram illustrating a method for draping 3D garments on the human body using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 receiving a plurality of human body inputs which includes data representation of a subject. Considering an example, referring now to FIG. 4, where the subject requests realistic 3D garments (T-shirt) to be draped with accurate fitness predicting 3D skinned garments (T-shirt) to drape the subject's body. Here, for the said example the system initially receives the plurality of human body inputs to predict 3D garments for the human body. The plurality of human body inputs includes the subject's (i) a body shape (β), (ii) a body measurements (α), (iii) a body pose (θ), and (iv) a garment style coefficients (γ). The body measurements coefficients include a $[β_1,β_2]$ where, a first coefficient of the body measurement is $β_1$ and a second coefficient of the body measurement is $β_2$.

Referring now to the steps of the method 300, at step 304, the one or more hardware processors 104 creating using a skinned multi person linear (SMPL) model, a 3D human body of the subject based on the body shape (β), and the body pose (θ) from the plurality of human body inputs. The SMPL model processes the plurality of human body inputs to create the 3D human body for predicting the 3D skinned garments (T-shirt) (FIG. 4) as depicted in the example. Here, the SMPL model represents the 3D human body as a function of the body pose and the body shape. The SMPL body model is defined in Equation 1 and Equation 2, $$SMPL(θ,β)=W(T_b(β,θ),T(β),θ,W) \quad \text{Equation 1}$$

$$T_b(θ,β)=V+B_s(β)+B_P(θ) \quad \text{Equation 2}$$

Where,
W(.) is a garment skinning function,
$T_b(β,θ)$ is a linear function,
J(.) is the skeleton joint prediction function and
W is the blend weights of skeleton J(.).

Figure 5:
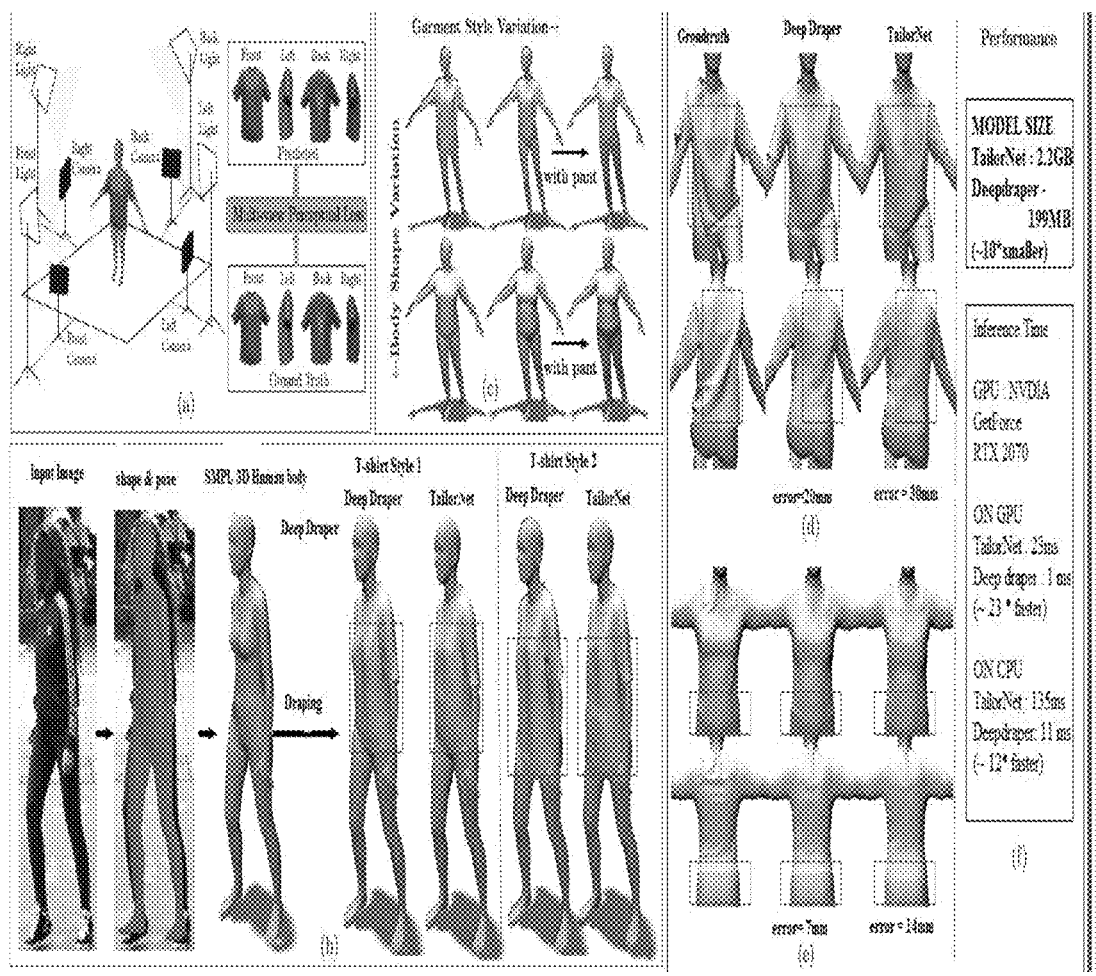
FIG. 5 illustrates an example 3D garment depicting the deep draper network for predicting the 3D garments based on a SMPL model using the system of FIG. 1, in accordance with some embodiments of the present disclosure.

The function $T_b(.)$ adds the body pose and the body shape dependent deformations $B_p$(.) and $B_s$(.) respectively to the base template mesh vertices $V \in R^{n*3}$ in a T-pose (FIG. 5). The final SMPL model is obtained by applying the garment skinning function to the updated mesh vertices. For the body pose, the SMPL model is the function of the body shape parameters/coefficients β as described in Equation 1. Further, the garment mesh vertices are defined as the subset of the SMPL model mesh vertices. Let I be an indicator matrix, whose element $i_{mn}=1$, indicates that the $m^{th}$ garment vertex is associated with the $n_{th}$ SMPL body vertex. The particular garment style draped over an unposed SMPL body is represented as $T_b(β,θ)$ is encoded as the vertex offsets O as shown in Equation 3, $$T_g(θ,β)=IT_b(β,θ)+O \quad \text{Equation 3}$$

Since the garment model is aligned with the SMPL model, for a fix O others in making assumption that clothing deforms similarly to the underlying body. Therefore, every garment vertex is deformed with their associated SMPL model body vertex using the skinning function as shown in Equation 4, $$\mathcal{G}(θ,β,O)=w(T_g(θ,β,O),T(β),θ,W) \quad \text{Equation 4}$$

The garment skinning function is invertible, and can obtain the un-posed garment deformation from the simulated garment $\mathcal{G}$(.) as shown in Equation 5.

$$O=W^{-1}(IT_b(β,θ)-\mathcal{G}(θ,β,O)) \quad \text{Equation 5}$$

Figure 6:
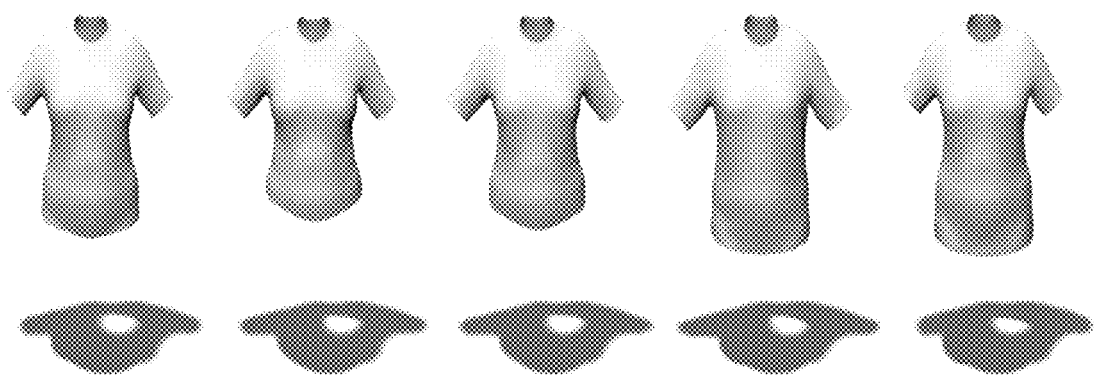
FIG. 6 illustrates an example 3D garment (T-shirt) style variations, in accordance with some embodiments of the present disclosure.
Figure 7:
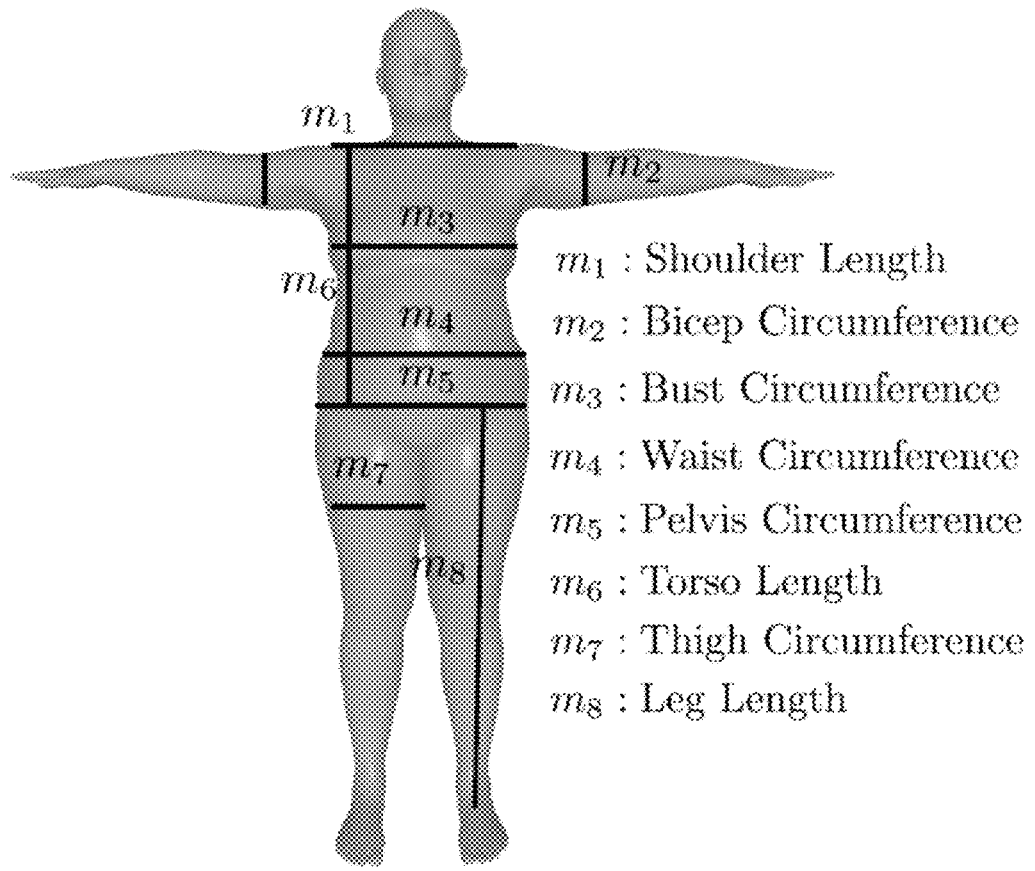
FIG. 7 illustrates an example 3D human body constructed from a plurality of human body inputs based on the SMPL model using the system of FIG. 1, in accordance with some embodiments of the present disclosure.

For a fix body shape (β) and body pose (θ), the garment vertices are the function of the vertex offsets O. The rows of the matrix $G=\mathcal{G}(θ, β, O)$ represents the vertices of the ground truth simulated garment. A set of sample garment style variations as shown in (FIG. 6). The method utilizes the publicly available (TailorNet) dataset and augment with additional ground-truth data: the body measurements and a normal mapped multi-view rendered garments.

In one embodiment, various body measurements are obtained as shown (FIG. 7) of the SMPL model in the T-pose. These are standard body measurements that directly affect a garment's fitment on the 3D human body and are commonly available on various online shopping websites or generally taken by a tailor for designing new customized garments. Typically, a buyer makes the choice of the 3D garment based on the subject's human body inputs. The difference in the measurement of the respective body part and the corresponding garment measurement defines the garment's overall fitment on the underlying body. For example, if the garment's bust circumference measurement is significantly large compared to the corresponding measurement of the body, then the garment would be a loose fit on the body. Due to these realistic observations, the body measurement is considered as significant input for accurately predicting 3D garment.

Referring now to the steps of the method 300, at step 306, the one or more hardware processors 104 predicting using a trained multi-layer perceptron model, via the one or more hardware processors, a garment vertices offsets based on the plurality of human body inputs. Referring now to the example (FIG. 4), Here, the SMPL model takes a PCA shape coefficient, $β \in R^{10}$ to compute the body measurements (α). For, the 3D skinned garment (T-shirt), the body measurements $α=[m_1, m_2, m_3, m_4, m_5, m_6]$ affects the T-shirt fitting. The trained multi-layer perceptron model predicts the garment vertices offsets. The deep draper network predicts the garment vertex offset with their garment vertex normal represented in Equation 6, $$\hat{O},\hat{N}=N(X;Θ) \quad \text{Equation 6}$$

Here, the notation '$\hat{O}$' represents model parameters to train the deep draper network.

Referring now to the steps of the method 300, at step 308, the one or more hardware processors 104 constructing using a garment skinning function, a 3D skinned garments for the subject using the garment vertex offset. The 3D garment $\hat{G}$ is constructed by applying the garment skinning function in Equation 7, $$\hat{G}=\mathcal{G}(θ,β,\hat{O})=w(T_g(θ,β,\hat{O}),T(β),θ,W) \quad \text{Equation 7}$$

Referring now to the steps of the method 300, at step 310, the one or more hardware processors 104 draping using a trained deep draper network, the 3D skinned garments for the 3D human body of the subject based on (i) the garment vertices offsets, and (iii) a plurality of pre-defined ground truth garment intermediate features obtained from the trained deep draper network, wherein the deep draper network is trained based on a plurality of losses. In one embodiment, referring now (FIG. 2), the deep draper network is trained to predict the 3D skinned garments (referring to the example of T-shirt) to be draped on the 3D human body.

Training the deep draper network comprises the following steps,

Step 1: constructing, a plurality of training data inputs obtained from a one or more subjects. The plurality of training data inputs includes (i) the training data body measurements (α), (ii) the training data body shape (β), (iii) the training data body pose (θ), and (iv) the training data garment style coefficients (γ). The input X for the deep draper network is constructed by stacking the body measurements coefficients $[β_1,β_2]$, based on the first coefficient of the body measurement is $β_1$ and the second coefficient of the body measurement is $β_2$ for the body shape, the body pose and the garment style. Here, the input to the deep draper network is represented as, $X=[α, β_1, β_2, θ, γ]$, where, the plurality of training data inputs includes, a training data body measurements (α), a training data body shape (β), a training data body pose (θ), and a training data garment style coefficients (γ).

Step 2: predicting, using a multi-layer perceptron model, the garment vertices offsets (Ô) and a garment vertex normal based on the plurality of training data inputs and a trained model parameters, wherein each training data body shape includes a first body coefficient and a second coefficient. The garment vertices offsets (Ô) and the garment vertex normal are predicted based on the plurality of training data inputs and a trained model parameters using the multi-layer perceptron model, wherein each training data body shape includes a first body coefficient and a second coefficient. The deep draper network predicts the garment vertex offset with their garment vertex normal represented in Equation 6.

Step 3: predicting, a 3D skinned garment images by applying (i) the garment skinning function on the garment vertices offsets, (ii) the training data body pose, (iii) the training data body shape, (iv) the training data body measurements, and (v) the training data garment style coefficients. The 3D garment Ĝ is constructed by applying the garment skinning function in Equation 7.

Step 4: assigning, a texture (T̂) to each predicted 3D skinned garment vertices offsets as a function of its unit texture normal ($\widehat{n_t}$). Further, a texture (T̂) is assigned to each predicted 3D skinned garment vertices offsets as a function of its unit texture normal ($\widehat{n_t}$). The texture to each predicted 3D skinned garment image is denoted as ($\widehat{t_i}$) which is a function of its unit texture normal ($\widehat{n_t}$) as represented in Equation 8, $$\hat{t}_l = [\widehat{t_{l1}}, \widehat{t_{l2}}, \widehat{t_{l3}}] = \tfrac{[\widehat{n_l}+1, \widehat{n_l}+1, \widehat{n_l}+1]}{2} \qquad \text{Equation 8}$$

Figure 8:
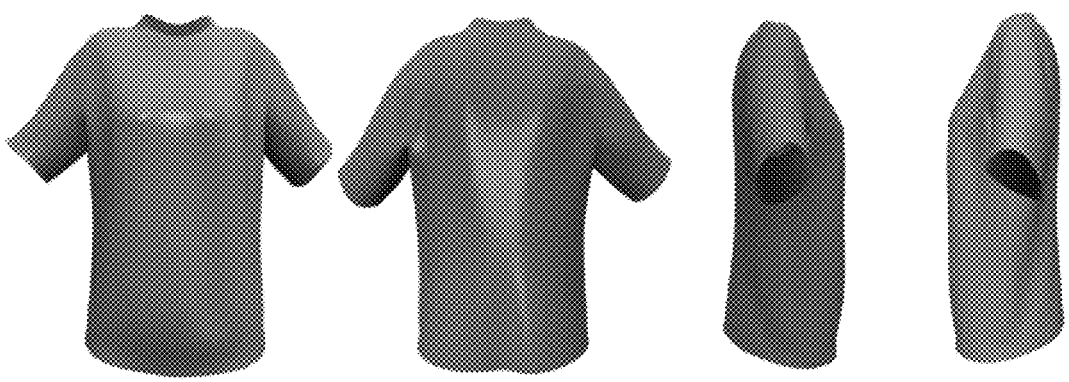
FIG. 8 illustrates an example multi view of 3D skinned garment images of a normal image mapped (T-shirt) draped over a body pose on the 3D human body, in accordance with some embodiments of the present disclosure.

Step 5: generating, using a multiview garment rendering model, a multi view of the 3D skinned garment images to exploit correlation between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image. The multiview garment rendering model is fine detailed with high frequency geometry of a deformed garment can be seen in a rendered images. The ground-truth multi-view rendered images are generated to exploit the correlation between the high-frequency garment geometry in 3D and the corresponding rendered image to compute the perceptual losses. In one embodiment, the multi-view rendering setup includes associate a texture to each garment vertex in G. The RGB value of the texture of a garment vertex is the function of the (x, y, z) components of its unit normal vector. Let T be the texture matrix, where each row $t_i$ represent the texture of the garment vertex $g_i$. Let ϕ(.) represents the rendering function, it is composed of a mesh rasterizer and a shader. The function ϕ(.) takes the garment vertices G, their textures T, garment mesh faces F, camera location C and the light location L. The output of the function ϕ(.) is the rendered image. Some sample multi-views are a front view rendered garment image, a back view rendered garment image, a right view rendered garment image, a left view rendered garment image, and a top view rendered garment image of the example (T-shirt) to be draped over the A-posed 3D human body is shown in FIG. 8. The lights and the camera setup for multi-view rendering are shown in FIG. 2 and it is realized that the function ϕ(.). It is to be noted that all the components of the function ϕ(.) are fully differentiable, therefore the same function ϕ(.) is used for rendering the multi-view images of the predicted 3D skinned garment images.

Step 6: feeding, the multi views of the 3D skinned garment images as input to a VGG19 network to predict garment intermediate features.

Step 7: comparing, the predicted garment intermediate features with the plurality of pre-defined ground truth garment intermediate features to obtain a perceptual loss corresponding to each multi view of the 3D skinned garment images, and Step 8: updating, the multi-layer perceptron model of the deep draper network based on the plurality of losses comprising (i) a perceptual loss, (ii) a geometric data loss, (iii) a body garment collision loss, and (iii) an image content loss.

In one embodiment, the geometric data loss includes a geometric loss predicted for each garment vertex offset with its ground truth offset, and a cosine similarity loss predicted for the garment vertex normal with its ground truth vertex normal. The geometric data losses consist of L1 loss ($L_{OL}$), where 'K' is the total number of garment vertex as described in Equation 9 and Equation 10, $$L_{OL} = \frac{1}{k}\sum_{k=1}^{K} \|\hat{O}_l - O_l\|1 \qquad \text{Equation 9}$$

$$L_{NL} = \frac{1}{k}\sum_{k=1}^{K} (1 - \tfrac{\hat{n}_i \cdot n_i}{\|\hat{n}_i\|\|n_i\|}) \qquad \text{Equation 10}$$

Let Ψ(.) be a function that takes the predicted garment mesh vertices Ĝ=$\mathcal{G}$(θ,β,Ô), ground-truth mesh faces F and the output the garment mesh vertices normals N̄. The normals in N are the function of the predicted offset Ô, and are different from the normals directly predicted by the network N̂. Then, the regularization loss is computed between N̄ and N̂ as described in Equation 11, $$\bar{N}=Ψ(\mathcal{G}(θ,β,\hat{O}),F) \qquad \text{Equation 11}$$

The regularization loss of the geometric data loss enforces the network to directly predict the garment vertex normal that are consistent with the predicted garment vertex offsets (N̂) as described in Equation 12, $$L_{NReg} = \frac{1}{k}\sum_{k=1}^{K} \|\hat{n}_l - \bar{n}_l\|2 \qquad \text{Equation 12}$$

The body garment collision loss ensures to predict the deformations are free from the body garment collisions, utilizing a body garment collision penalty. Specifically, for each predicted garment vertex say $i^{th}$ vertex $\hat{g}_i$, the nearest 3D body vertex is found (say $j^{th}$ vertex) $V_j$ with its associated normal $n_j$. The body garment collision loss is computed as described in Equation 13, $$L_{coll} = \frac{1}{k}\sum_{k=1}^{K} \max(-n_j(v_j - \hat{g}_i), 0) \qquad \text{Equation 13}$$

The perceptual loss, ϕ(.) is a differential rendering function, wherein using the rendering function of the multiview garment rendering model, the front view rendered garment image is computed based on the predicted garment vertices (Ĝ) the texture (T̂), the garment mesh faces (F), a front camera ($C_{front}$) and a front light ($L_{front}$). The perceptual loss (PL) is computed for the front view rendered garment image of a deformed garment by computing the $I_{\hat{G},\hat{T},front}$ using the rendering function $\phi(.)$ as shown in Equation 14, $$I_{\hat{G},\hat{T},front} = \Phi(\hat{G},\hat{T},F,C_{front},L_{front})$$ Equation 14

The perceptual metric is a loss to capture the perceptual similarity between the ground truth of the front view rendered images and the predicted front view rendered image. Then, these predicted front view rendered image are fed as input to the VGG19 network to extract the intermediate features maps ($\Gamma$) from the CNN layers (S=[1,3,5,9,13]). The perceptual loss similarity PL(.) between the two images is the weighted L1-loss between their intermediate feature maps. The perceptual loss of the front view rendered garment image is computed based on the perceptual similarity between the front view rendered garment image and the ground truth of the front view rendered garment images as represented in Equation 15, $$PL(I_{G,T,front}, I_{\hat{G},\hat{T},front}) = \Sigma_{l \in S} \lambda_l \| \Gamma_{G,T,front}^l - \Gamma_{\hat{G},\hat{T},front}^l \|_1$$ Equation 15

Where, ($\Gamma^l$) denote the $l^{th}$ layer feature map and $\lambda_l$ is the weightage of the $l^{th}$ layer. The total perceptual loss for the front view rendered image is the sum of the predicted garment vertex of the front view garment rendered garment image and the ground truth of the garment vertices is given in Equation 16, $$l^{front} = PL(I_{G,T,front}, I_{\hat{G},\hat{T},front}) + PL(I_{G,T,front}, I_{G,\hat{T},front})$$ Equation 16

The perceptual loss in Equation 16, forces the network to predict garment vertex texture (predicted vertex normals via normal mapping) to be consistent with the ground truth vertex texture in the images space. It is to be noted that defining the notation, is the quantities without the over-hat is the ground-truth, while with the over-hat is the network predicted. In the first component of the summation in the Eq. 16, considering the predicted garment vertices for the multi-view rendering of both the images $I_{\hat{G},T,front}$ and $I_{\hat{G},\hat{T},front}$ while in second component we use the ground-truth garment vertices. The rasterization and the shading components of the rendering layer are differentiable. Therefore the loss in the Equation 16, is fully differentiable. Then, the total perceptual loss for multi-views are collected for the front view, the back view, the right view, the left view, and the top view. The total multi-view perceptual loss is the sum of the front lighting, the back lighting, the right lighting, the left lighting, and the top lighting, given in Equation 17, $$L_p = l^{front} + l^{back} + l^{left} + l^{right} + l^{top}$$ Equation 17

The image content loss is the average L1 distance between the ground truth with its respective predicted rendered multi view images. The image content loss is the average distance between the predicted front view rendered garment images with its corresponding ground truth images Let the image content loss ($l_{con}^{front}$) for the front view rendered image is given in Equation 18, $$l_{con}^{front} = \| I_{\hat{G},T,front} - I_{\hat{G},\hat{T},front} \|_1 + \| I_{G,T,front} - I_{G,\hat{T},front} \|_1$$ Equation 18

The total content loss is collected $l_{con}$ which is the sum of a front view content loss, a back view content loss, a left view content loss, a right view content loss, and a top content loss in Equation 19, $$L_{con} = l_{con}^{front} + l_{con}^{back} + l_{con}^{left} + l_{con}^{right} + l_{con}^{top}$$ Equation 19

The total loss $l_{total}$ to train the deep draper network is the combination of the geometric loss, the perceptual loss, the body garment collision loss, and the image content loss. The total loss for the deep draper network is a sum of (i) the geometric loss multiplied with its corresponding geometric weight component, (ii) the cosine similarity loss multiplied with its corresponding cosine similarity weight component, (iii) the regularization loss multiplied with its corresponding regularization weight component, (iv) the perceptron loss multiplied with its corresponding perceptron weight component, (v) a body garment collision loss multiplied with its corresponding body garment collision weight loss component, and (vi) the content loss multiplied with its corresponding content weight loss component. The $\gamma$ in the Equation 20, denotes the weightage of the respective loss components, $$L_{total} = \gamma_{OL} L_{OL} + \gamma_{NL} L_{NL} + \gamma_{NReg} L_{NReg} + \gamma_p L_p + \gamma_{coll} L_{coll} + \gamma_{con} L_{con}$$ Equation 20

Figure 9:
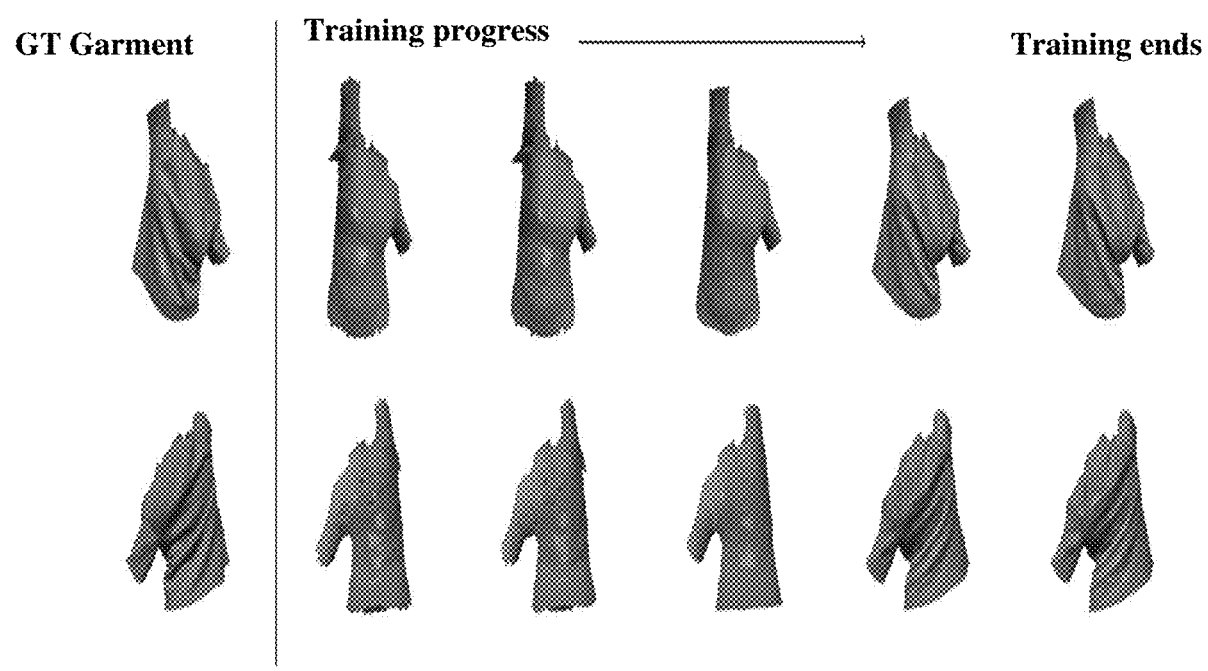
FIG. 9 illustrates an example 3D skinned garment images (T-shirt) representing a ground truth vertex normal mapped on a ground truth vertices with wrinkles and folds, in accordance with some embodiments of the present disclosure.

The deep draper network is trained using the plurality of losses with the trainable parameters of the MLP, the weights of the VGG19 network. Further, the sample intermediate front and the back view rendering results of a normal mapped skinned t-shirt are shown in FIG. 9. It shows that the method disclosed learns both the low frequency and high-frequency geometry (wrinkles and folds) as training progresses. The deep draper network can output temporally consistent 3D garment deformation because jointly the unified model is learned to predict the 3D garment as a function of body pose, body shape, body measurements, and garment style.

FIG. 9 illustrates an example 3D skinned garment images (T-shirt) representing a ground truth vertex normal mapped on a ground truth vertices with wrinkles and folds, in accordance with some embodiments of the present disclosure. The first column shows the ground-truth i.e., ground-truth vertex normal mapped on the ground-truth t-shirt vertices followed by the garment skinning and the rendering, while the remaining columns shows the Gpredicted normal mapped on the predicted garment vertices followed by the skinning and the rendering. The first and the second row shows the front view and the back view rendering as the training of the deep draper network progress.

Figure 10:
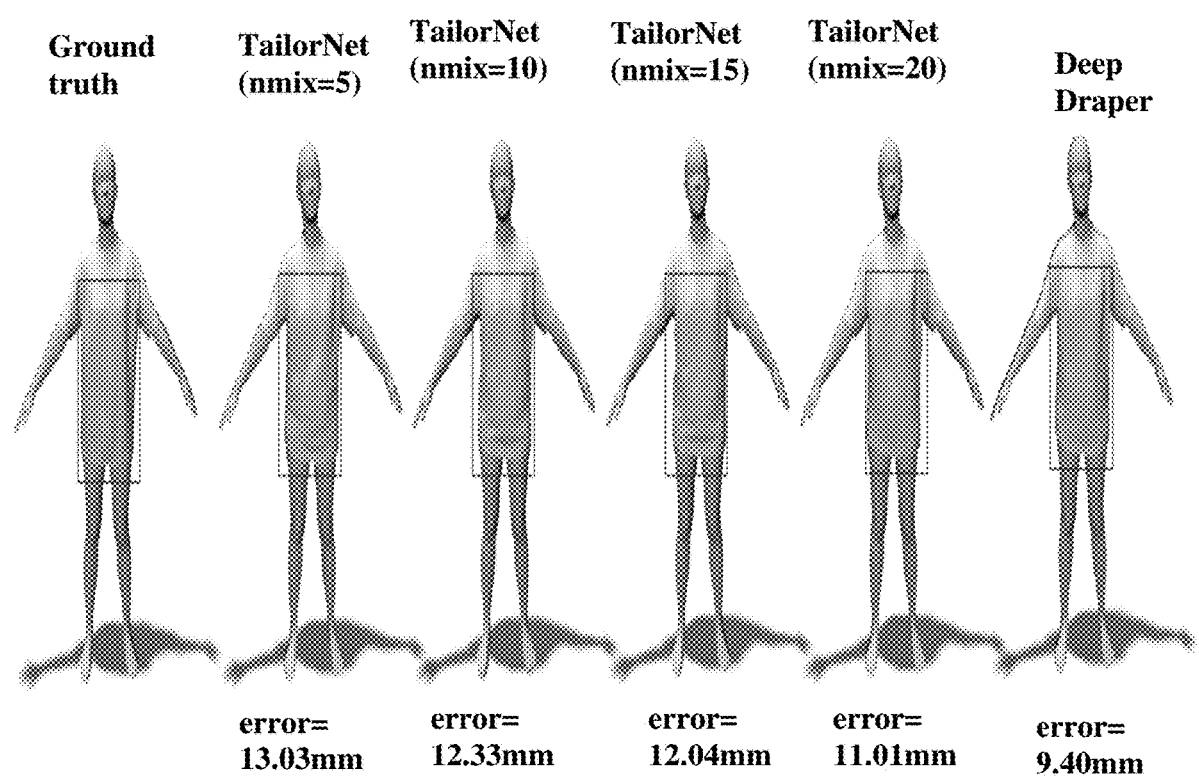
FIG. 10 illustrates an example 3D garment (T-shirt) experimental results of the deep draper network plotted with varying human body inputs in comparison with an existing technique using the system of FIG. 1, in accordance with some embodiments of the present disclosure.

FIG. 10 illustrates an example 3D garment (T-shirt) experimental results of the deep draper network plotted with varying human body inputs in comparison with an existing technique using the system of FIG. 1, in accordance with some embodiments of the present disclosure. The figure depicts the referred example to predict 3D garment images (T-shirt) using the deep draper network performing quantitative analysis with the existing method (TailorNet) method in different pose variations. Here, the visual results of the (TailorNet) are sensitive to the number of mixture components used for the final prediction of the 3D skinned garment images. Table 1 show the comparison in the mean per vertex error. While it may seem the difference is small however a small improvement in the mean per-vertex error has a significant impact on visual and fitment results as shown in the figure.

TABLE 1

| Quantitative Result (T-shirt, female) | |
| --- | --- |
| Method | Mean per vertex error in nm |
| TailorNet | 12.32 |
| Deep Draper network | 12.11 |

Furthermore, the method disclosed significantly improves memory efficiency and inference time. Referring now to Table 2 which shows the comparison of execution time and model size with TailorNet. The method takes ~10× lesser memory space and run ~23× faster on GPU and ~11× faster on CPU, than the TailorNet.

TABLE 2

Performance Metrics

| Method | Model Size | Inference time (ms) | |
|---|---|---|---|
| | | GPU | CPU |
| TailorNet | 2.2 GB | ~23 | ~135 |
| Deep draper network | 199 MB (10*smaller) | ~1 (~23*faster) | ~11 (~12*faster) |

The run time evaluation of the proposed method and the TailorNet with Intel i7 CPU and Nvidia GeForce RTX 2070 GPU is specified.

In one embodiment, the implementation details, the trained deep draper network with batch size 32 and use Adam optimizer. The method disclosed has MPL into three hidden layers, predicting vertex offset and its unit normal, the output dimension of the MLP is the 6 times K (K is the number of the garment vertices). Further, an L2-normalization layer is applied to transform the network predicted normal to unit normal. The pre-trained VGG19 network, is used for an image classification task on ImageNet dataset and freeze its weights. The weights of the feature maps for computing the perceptual loss in Equation 16 are as follows [λ1, λ3, λ5, λ9, λ13]=[1.0/32, 1.0/16, 1.0/8, 1.0/4, 1.0]. These values are like the one used in image synthesis works. The differential renderer has set the rasterizer image size to 64×64, blur radius to 0.0 and the faces per pixel to 1. Initially, learning rate is set to 1e−4 and reduce it by a factor of 0.1 after every 100 epochs up-to 1e−7. The deep draper network has a total of 500 epochs, setting the weightage of the loss component YOL=1e3, to bring it on the same scale as the other loss components. The weightage of the remaining components in the Equation. 20 are set to one.

Figure 11:
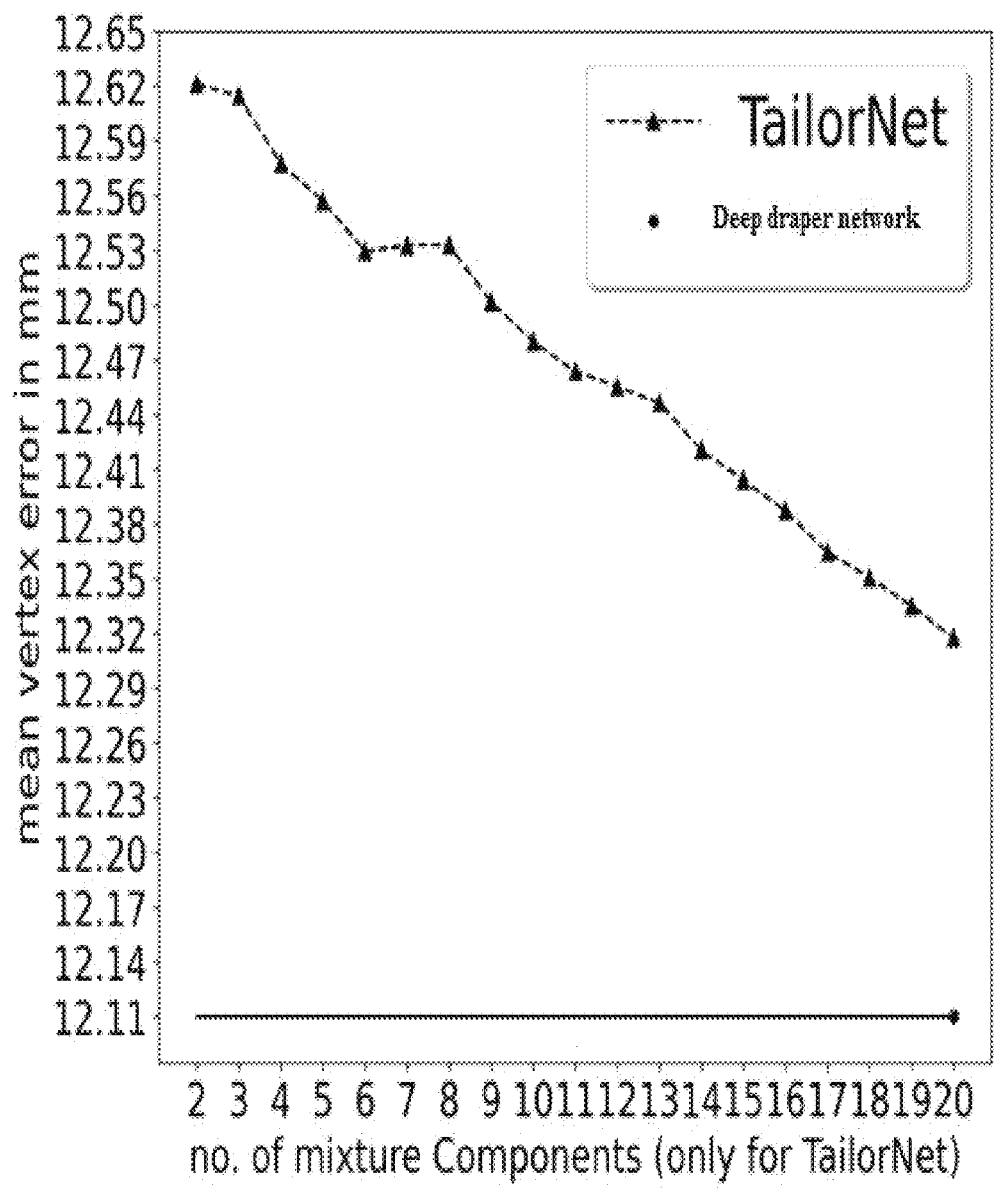
FIG. 11 illustrates graphical representation of varying human body inputs versus mean vertex error using the system of FIG. 1, in accordance with some embodiments of the present disclosure.

FIG. 11 illustrates graphical representation of varying human body inputs versus mean vertex error using the system of FIG. 1, in accordance with some embodiments of the present disclosure. The figure depicts the Single Model vs. Mixture Model Comparison: TailorNet follow a mixture model approach to model the high-frequency geometry of the deformed 3D garment. It learns each mixture component, i.e., the body shape and the garment style-specific deformation model separately and combined them using an RBF Kernel. In contrast to the learning separate shape style specific garment deformation models, the trained single unified network jointly models the factor of variations in the body shape, the body pose, the body measurements, and the garment style. The sensitivity evaluation of the TailorNet the number of mixture components and the results are average over 20 runs. The effect of different number of mixture components on visual appearance is shown in the FIG. 11. Since, the mixture component are the body shape and the garment style specific, removing some of the mixture components affects the visual results of the TailorNet. The disclosed method is the single unified model; hence the number of mixture components on the horizontal axis is only for the TailorNet.

Figure 12A:
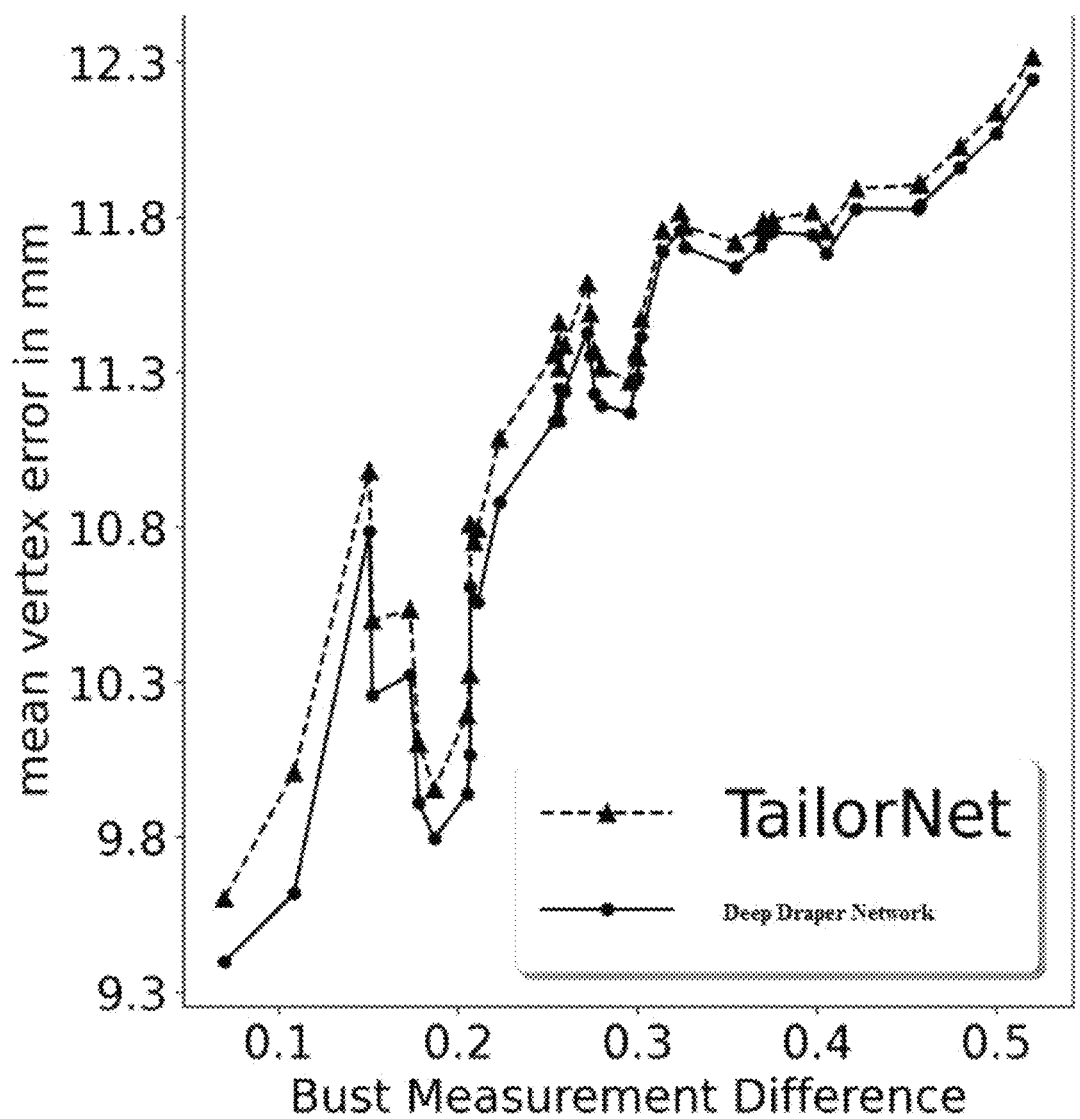
FIG. 12A illustrates graphical representation of the human body inputs with varying bust measurement plotted for mean vertex error using the system of FIG. 1, in accordance with some embodiments of the present disclosure.
Figure 12B:
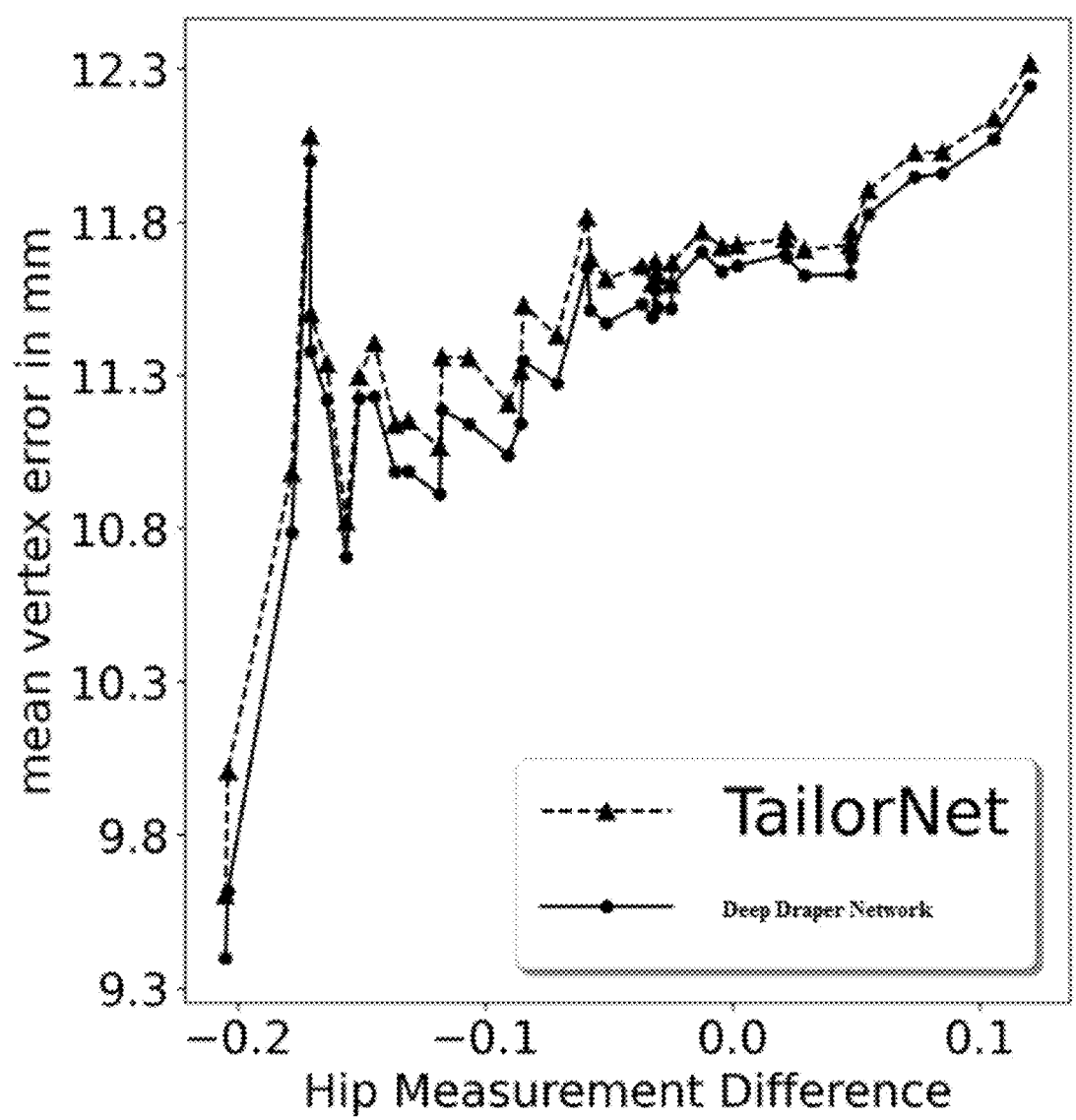
FIG. 12B illustrates graphical representation of the human body inputs with varying waist measurement plotted for mean vertex error using the system of FIG. 1, in accordance with some embodiments of the present disclosure.
Figure 12C:
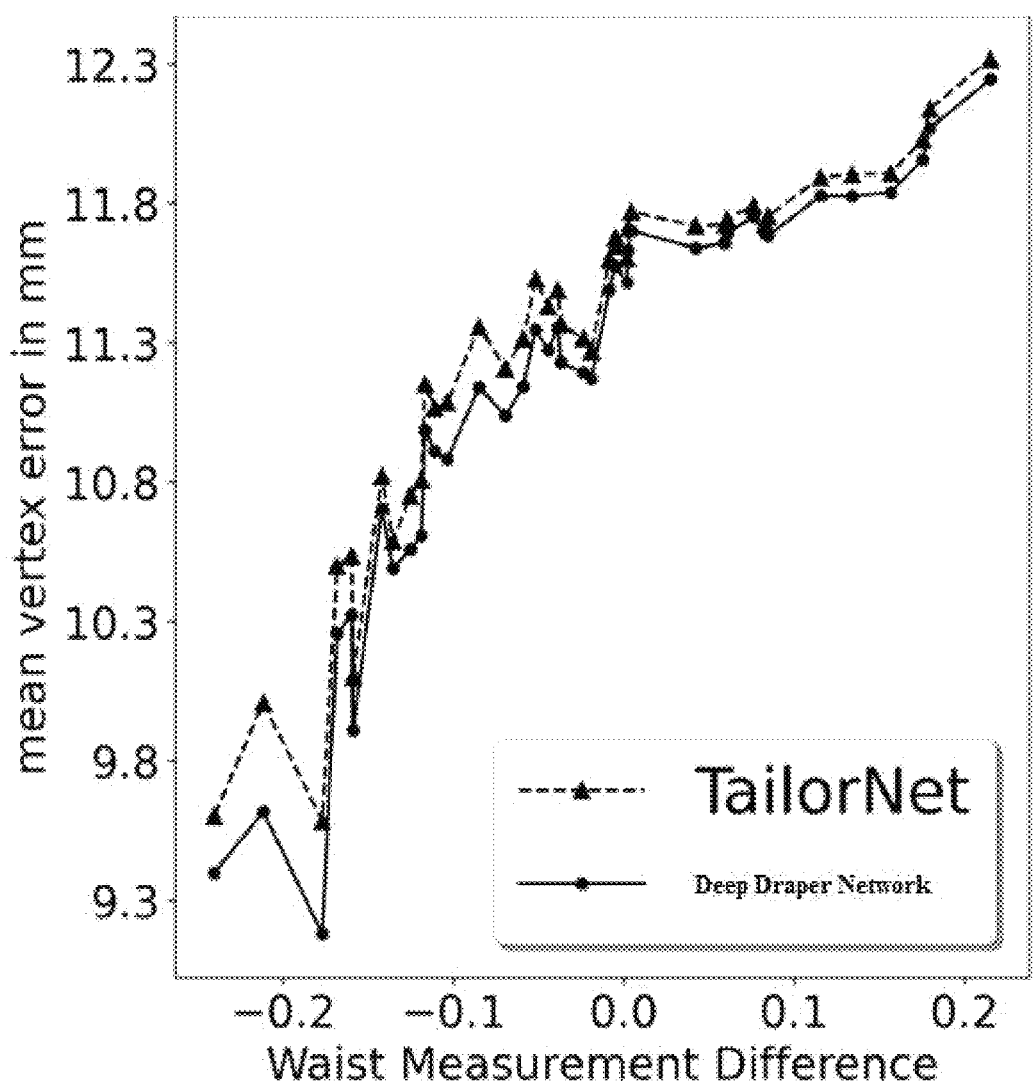
FIG. 12C illustrates graphical representation of the human body inputs with varying hip measurement plotted for mean vertex error using the system of FIG. 1, in accordance with some embodiments of the present disclosure.
Figure 13:
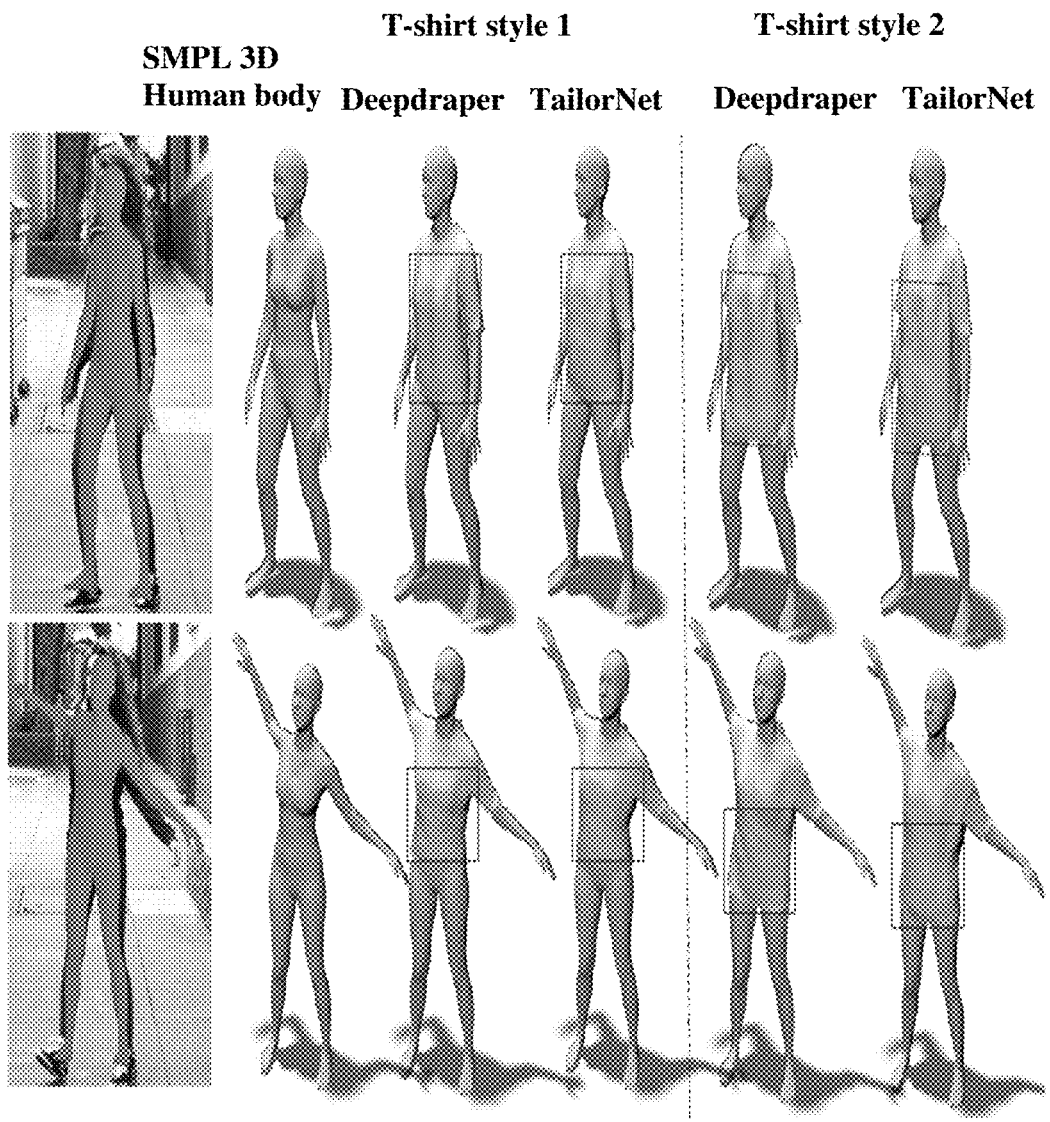
FIG. 13 illustrates the multi view of the 3D skinned garment images performance metrics in comparison with existing technique using the system of FIG. 1, in accordance with some embodiments of the present disclosure.

FIG. 12A illustrates graphical representation of the human body inputs with varying bust measurement plotted for mean vertex error using the system of FIG. 1, in accordance with some embodiments of the present disclosure. Fitment Analysis is performed and compared with the method disclosed with the TailorNet in the context of garment fitting. Similar, to the body measurements shown in FIG. 7, computing the ground truth garments measurement. Specifically, the bust, the waist, and the hip circumference of both the garment are computed with the respective body parts. Referring now to (FIG. 12B and FIG. 12C) the result shows the mean per-vertex error against the difference in the respective measurements of the garment and the body. The negative value on the x-axis indicates the garment is tight (e.g., garment measurement on the bust is smaller than the bust measurement of the naked body) at the respective body parts (bust, waist, or hip). The method consistently outperforms the TailorNet for both loose and tight-fitting garments.

Figure 14:
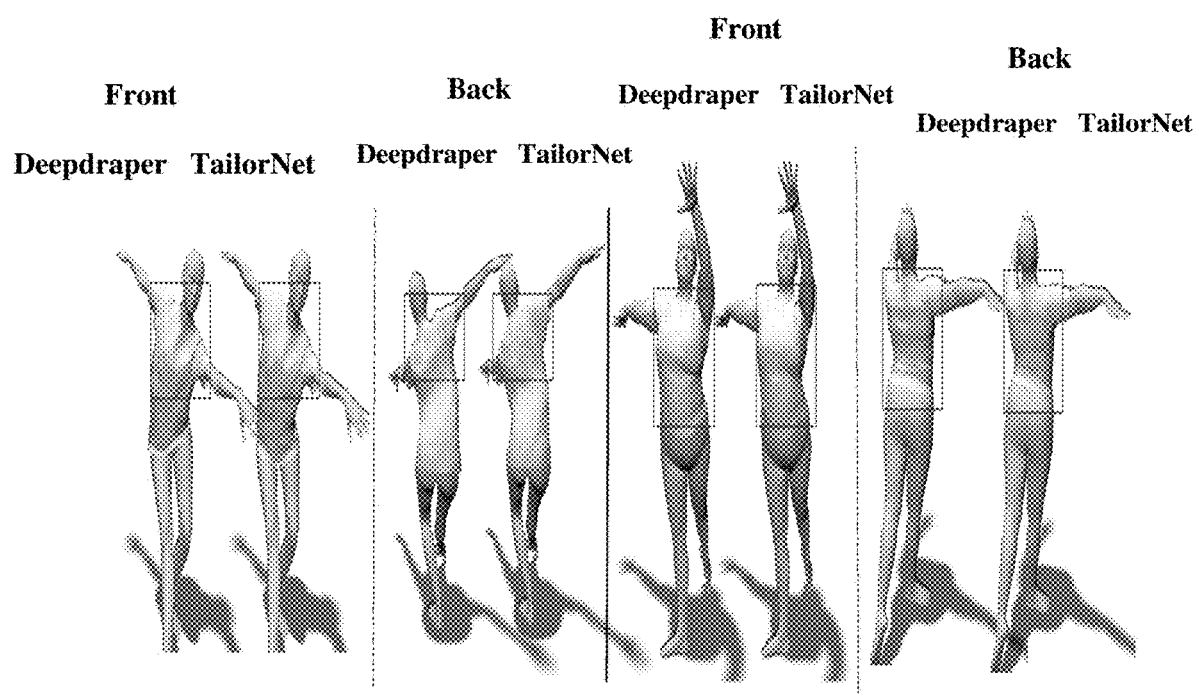
FIG. 14 illustrates the multi view of the 3D skinned garment images predicting accurate fitment for the human body using the system of FIG. 1, in accordance with some embodiments of the present disclosure.

FIG. 14 illustrates the multi view of the 3D skinned garment images predicting accurate fitment for the human body using the system of FIG. 1, in accordance with some embodiments of the present disclosure. In this figure, the disclosed method is computed and compared with the TailorNet on frames. Here, using the SMPL model the body shape and the pose parameters for each frame are extracted. The body shape, the body pose, and the body measurements are entirely unknown and in the wild setting (FIG. 13) shows that the deep draper network results are better than the TailorNet in terms of visual equivalence of fitting and rendering (see the red box). The trained model on the static poses, produces temporally consistent 3D clothing animation.

Figure 15:
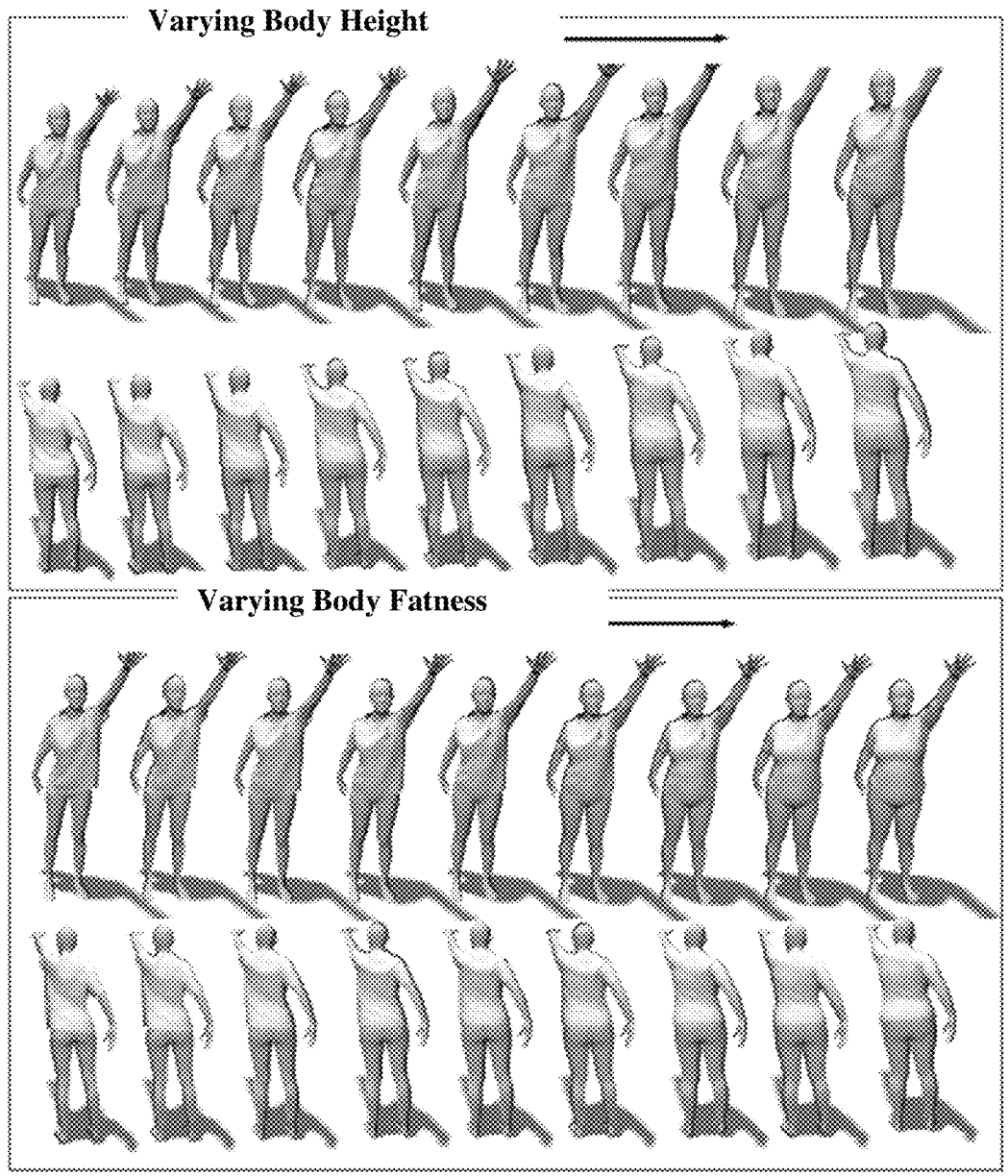
FIG. 15 illustrates the multi view of the 3D skinned garment images representing the effect of wrinkles, folds and overall fitment as the human body varies in height and fatness using the system of FIG. 1, in accordance with some embodiments of the present disclosure.

FIG. 15 illustrates the multi view of the 3D skinned garment images representing the effect of wrinkles, folds and overall fitment as the human body varies in height and fatness using the system of FIG. 1, in accordance with some embodiments of the present disclosure. Sample qualitative results highlights the differences using the bounding box. TailorNet predicts a bulge around the stomach, while the proposed disclosure predicts accurate fold and wrinkles. To evaluate the deep draper network generalization capability, the model on the pose sequence of the different unseen AMASS dataset. The figure demonstrates that proposed disclosure produces visually plausible fitment and rendering even on an unseen pose sequence. Further, analyzing the effect on the wrinkles and the folds, the overall fitment of the final predicted 3D garment image as the function of human height, keeping the fatness of the human body fixed and human body fatness keeping the height fixed.

Figure 16:
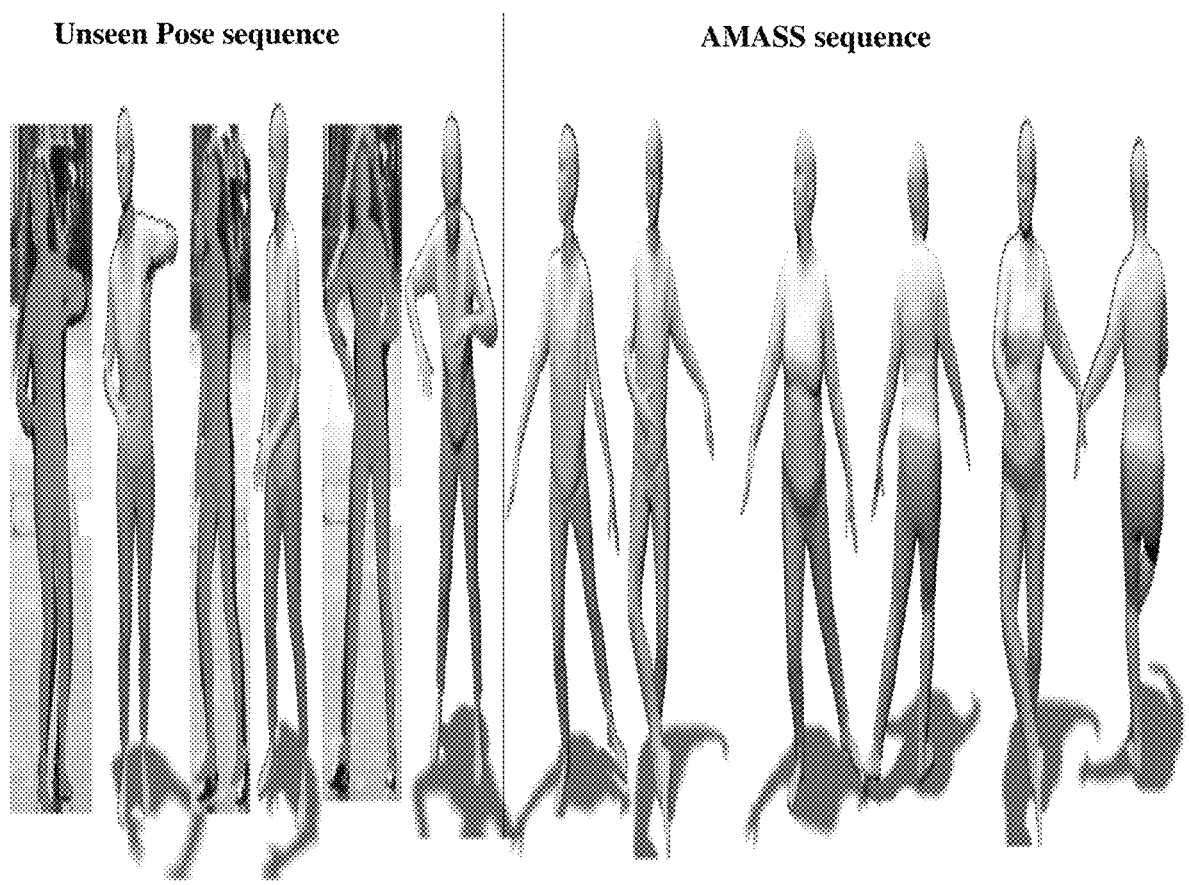
FIG. 16 illustrates experimental results of the 3D skinned garment images of the unseen pose sequence, in accordance with some embodiments of the present disclosure.

FIG. 16 illustrates experimental results of the 3D skinned garment images of the unseen pose sequence, in accordance with some embodiments of the present disclosure. The generalization of the deep draper network with other garments, training the network with female pants from the TailorNet dataset. The body measurements α=[m4, m5, m7, m8]. Only these measurements affect the deformation of the pants. All the settings remain the same as for the t-shirt garment. The quantitative comparison with the TailorNet is shown in Table 3. The qualitative results on unseen human body shape and poses are shown in the FIG. 16. These visually consistent results for fitment and rendering of multiple garments like t-shirt and pants show the effectiveness of the deep draper network compared ith the TailorNet.

TABLE 3

| | Quantitative Result (Pant Female) |
|---|---|
| Method | Mean per vertex error in nm |
| TailorNet | 4.8 |
| Deep draper network | 4.6 |

Based on Equation 20, the effect of different loss component represents the Ablation study for fitting and multi view rendering of garment images. Table 4 represents the result of the ablation study where it is evident that the usage of both the geometric losses and perceptual losses provides accurate results.

TABLE 4

| | Ablation study |
|---|---|
| Losses (Equation 20) | Mean per vertex error in nm |
| $L_{OL}$ | 12.55 |
| $L_{OL} + L_{NL}$ | 12.48 |
| $L_{OL} + L_{NL} + L_{NReg}$ | 12.41 |
| $L_{OL} + L_{NL} + L_{NReg} + L_P$ | 12.11 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of predicting accurate fitting of 3D garments for draping the 3D human body. The embodiment thus provides a method and system for draping a 3D garment on a 3D human body. Moreover, the embodiments herein further provides predicting accurate fitting of 3D garment images considering the body pose, the body shape with wrinkles and folds. The method analyzes the effect on the wrinkles and folds, and overall fitment of the final predicted 3D garment as the function of human height, keeping the fatness of the human body fixed and human body fatness keeping the height fixed. The method for draping 3D garments over the 3D human body, has immense applications in virtual try-on, animations, etc. The present disclosure with single unified garment deformation model learns the shared space of variations in the body shape, the body pose, and the garment style, yielding realistic rendering in terms of wrinkles and folds on the output garment. The body measurement along with the body shape provides better fitment, unlike the existing methods. The deep draper network significantly improved the final draping of the 3D garment over the 3D human body compared with the state-of-the-art methods. Moreover, the method is smaller size, faster inference which makes the deep draper network memory efficient and computationally cheaper, suitable for portable devices and web-based applications.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for draping a 3D garment on a 3D human body, the method comprising:
receiving, via a one or more hardware processors, a plurality of human body inputs which includes data representation of a subject;
creating, using a skinned multi person linear (SMPL) model, via the one or more hardware processors, a 3D human body of the subject based on a body shape ($\beta$), and a body pose ($\theta$) of the plurality of human body inputs;
predicting, using a multi-layer perceptron model, via the one or more hardware processors, garment vertex offsets based on the plurality of human body inputs, wherein the plurality of human body inputs includes the subject's (i) body shape ($\beta$), (ii) body measurements ($\alpha$), (iii) body pose ($\theta$), and (iv) garment style coefficient (y);
constructing, using a garment skinning function, via the one or more hardware processors, 3D skinned garments for the subject using the garment vertex offsets; and
draping, using a trained deep draper network, via the one or more hardware processors, the 3D skinned garments on the 3D human body of the subject based on
(i) the garment vertex offsets, and
(ii) a plurality of pre-defined ground truth garment intermediate features obtained from the trained deep draper network, wherein the deep draper network is trained based on a plurality of losses,
wherein training the deep draper network comprises:
constructing a plurality of training data inputs for the deep draper network from one or more subjects, wherein the plurality of training data inputs includes (i) training data body measurements ($\alpha$), (ii) a training data body shape ($\beta$), (iii) a training data body pose ($\theta$), and (iv) training data garment style coefficients (Y);
predicting, using a multi-layer perceptron model, the garment vertex offsets ($\hat{O}$) and a garment vertex normal based on the plurality of training data inputs and trained model parameters, wherein each training data body shape includes a first body coefficient and a second coefficient;
predicting 3D skinned garment images by applying (i) the garment skinning function on the garment vertex offsets, (ii) the training data body pose, (iii) the training data body shape, (iv) the training data body measurements, and (v) the training data garment style coefficients;
assigning a texture ($\hat{T}$) to each predicted 3D skinned garment vertex offset as a function of its unit texture normal ($n_t$);
generating, using a multiview garment rendering model, a multi view of the 3D skinned garment images to exploit correlations between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image;
feeding the multi views of the 3D skinned garment images as input to a VGG19 network to predict garment intermediate features;
comparing the predicted garment intermediate features with the plurality of pre-defined ground truth garment intermediate features to obtain a perceptual loss corresponding to each multi view of the 3D skinned garment images; and
updating the multi-layer perceptron model of the deep draper network based on the plurality of losses comprising (i) a perceptual loss, (ii) a geometric data loss, (iii) a body garment collision loss, and (iv) an image content loss.

2. The processor implemented method of claim 1, wherein the geometric data loss includes (i) a geometric loss predicted for each garment vertex offset with its ground truth offset, and (ii) a cosine similarity loss predicted for the garment vertex normal with its ground truth vertex normal.

3. The processor implemented method of claim 1, wherein a regularization loss of the geometric data loss enforces the deep draper network to directly predict the garment vertex normal that are consistent with the predicted garment vertex offsets ($\hat{N}$).

4. The processor implemented method of claim 1, wherein using a rendering function of the multiview garment rendering model, the front view rendered garment image is computed based on the predicted garment vertices ($\hat{G}$) the texture ($\hat{T}$), the garment mesh faces (F), a front camera ($C_{front}$) and a front light ($L_{front}$).

5. The processor implemented method of claim 1, wherein the perceptual loss of the front view rendered garment image is computed based on the perceptual similarity between the front view rendered garment image and the ground truth of the front view rendered garment images.

6. The processor implemented method of claim 1, wherein a total perceptual loss for the front view rendered image is the sum of the predicted garment vertex of the front view garment rendered garment image and the ground truth of the garment vertices.

7. The processor implemented method of claim 1, wherein a total multi-view perceptual losses is the sum of the front light, a back lighting, a right lighting, a left lighting, and a top lighting.

8. The processor implemented method of claim 1, wherein the image content loss is the average distance between the predicted front view rendered garment images with its corresponding ground truth images.

9. The processor implemented method of claim 1, wherein a total image content loss is the sum of a front view content loss, a back view content loss, a left view content loss, a right view content loss, and a top content loss.

10. The processor implemented method of claim 1, wherein a total loss for the deep draper network is a sum of (i) the geometric loss multiplied with corresponding geometric weight component, (ii) a cosine similarity loss multiplied with its corresponding cosine similarity weight component, (iii) the regularization loss multiplied with corresponding regularization weight component, (iv) a perceptual loss multiplied with corresponding perceptron weight component, (v) a body garment collision loss multiplied with its corresponding body garment collision weight loss component, and (vi) the content loss multiplied with its corresponding content weight loss component.

11. A system for draping a 3D garment on a 3D human body, comprising:
- a memory storing instructions;
- one or more communication interfaces; and
- one or more hardware processors coupled to the memory via the one or more communication interfaces, wherein the one or more hardware processors are configured by the instructions to:
- receive a plurality of human body inputs which includes data representation of a subject;
- create, using a skinned multi person linear (SMPL) model, a 3D human body of the subject based on a body shape ($\beta$), and a body pose ($\theta$) of the plurality of human body inputs;
- predict, using a multi-layer perceptron model, garment vertex offsets based on the plurality of human body inputs,
- wherein the plurality of human body inputs includes the subject's (i) body shape ($\beta$), (ii) body measurements ($\alpha$), (iii) body pose ($\theta$), and (iv) garment style coefficient (y);
- construct, using a garment skinning function, 3D skinned garments for the subject using the garment vertex offsets; and
- drape, using a trained deep draper network, the 3D skinned garments for the 3D human body of the subject based on (i) the garment vertex offsets, and (ii) a plurality of pre-defined ground truth garment intermediate features obtained from the trained deep draper network, wherein the deep draper network is trained based on a plurality of losses,
- wherein training the deep draper network comprises:
- constructing a plurality of training data inputs for the deep draper network from one or more subjects, wherein the plurality of training data inputs includes (i) training data body measurements ($\alpha$), (ii) a training data body shape ($\beta$), (iii) a training data body pose ($\theta$), and (iv) training data garment style coefficients (Y),
- predicting, using a multi-layer perceptron model, the garment vertex offsets ($\acute{O}$) and a garment vertex normal based on the plurality of training data inputs and trained model parameters, wherein each training data body shape includes a first body coefficient and a second coefficient;
- predicting 3D skinned garment images by applying (i) the garment skinning function on the garment vertex offsets, (ii) the training data body pose, (iii) the training data body shape, (iv) the training data body measurements, and (v) the training data garment style coefficients;
- assigning a texture ($\acute{T}$) to each predicted 3D skinned garment vertex offset as a function of its unit texture normal ($n_i$);
- generating, using a multiview garment rendering model, a multi view of the 3D skinned garment images to exploit correlations between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image;
- feeding the multi views of the 3D skinned garment images as input to a VGG19 network to predict garment intermediate features;
- comparing the predicted garment intermediate features with the plurality of pre-defined ground truth garment intermediate features to obtain a perceptual loss corresponding to each multi view of the 3D skinned garment images; and
- updating the multi-layer perceptron model of the deep draper network based on the plurality of losses comprising (i) a perceptual loss, (ii) a geometric data loss, (iii) a body garment collision loss, and (iv) an image content loss.

12. One or more non-transitory machine readable information storage mediums comprising one or more instructions which when executed by one or more hardware processors cause:
- receiving a plurality of human body inputs which includes data representation of a subject;
- creating, using a skinned multi person linear (SMPL) model, a 3D human body of the subject based on a body shape ($\beta$), and a body pose ($\theta$) from the plurality of human body inputs;
- predicting, using a multi-layer perceptron model, garment vertex offsets based on the plurality of human body inputs, wherein the plurality of human body inputs includes the subject's (i) body shape ($\beta$), (ii) body measurements (a), (iii) body pose ($\theta$), and (iv) garment style coefficient (y);
- constructing, using a garment skinning function, 3D skinned garments for the subject using the garment vertex offsets; and
- draping, using a trained deep draper network, the 3D skinned garments for the 3D human body of the subject based on (i) the garment vertex offsets, and (ii) a plurality of pre-defined ground truth garment intermediate features obtained from the trained deep draper network, wherein the deep draper network is trained based on a plurality of losses,
- wherein training the deep draper network comprises:
- constructing a plurality of training data inputs for the deep draper network from one or more subjects, wherein the plurality of training data inputs includes (i) training data body measurements ($\alpha$), (ii) a training data body shape ($\beta$), (iii) a training data body pose ($\theta$), and (iv) training data garment style coefficients (Y),
- predicting, using a multi-layer perceptron model, the garment vertex offsets ($\acute{O}$) and a garment vertex normal based on the plurality of training data inputs and trained model parameters, wherein each training data body shape includes a first body coefficient and a second coefficient;
- predicting 3D skinned garment images by applying (i) the garment skinning function on the garment vertex offsets, (ii) the training data body pose, (iii) the training data body shape, (iv) the training data body measurements, and (v) the training data garment style coefficients;
- assigning a texture ($\acute{T}$) to each predicted 3D skinned garment vertex offset as a function of its unit texture normal ($n_i$);
- generating, using a multiview garment rendering model, a multi view of the 3D skinned garment images to exploit correlations between each high frequency garment in 3D with its corresponding rendered image using (i) the garment vertex normal, (ii) a front view rendered garment image, (iii) a back view rendered garment image, (iv) a right view rendered garment image, (v) a left view rendered garment image, and (vi) a top view rendered garment image;

feeding the multi views of the 3D skinned garment images as input to a VGG19 network to predict garment intermediate features;

comparing the predicted garment intermediate features with the plurality of pre-defined ground truth garment intermediate features to obtain a perceptual loss corresponding to each multi view of the 3D skinned garment images; and updating the multi-laver perceptron model of the deep draper network based on the plurality of losses comprising (i) a perceptual loss, (ii) a geometric data loss, (iii) a body garment collision loss, and (iv) an image content loss.

13. The one or more non-transitory machine-readable information storage mediums of claim 12, wherein the geometric data loss includes (i) a geometric loss predicted for each garment vertex offset with its ground truth offset, and (ii) a cosine similarity loss predicted for the garment vertex normal with its ground truth vertex normal.

14. The one or more non-transitory machine-readable information storage mediums of claim 12, wherein the regularization loss of the geometric data loss enforces the network to directly predict the garment vertex normal that are consistent with the predicted garment vertex offsets (N).

* * * * *